(12) United States Patent
Viavattine

(10) Patent No.: US 7,035,078 B1
(45) Date of Patent: Apr. 25, 2006

(54) FOLDED PLATE ELECTRODE ASSEMBLIES FOR BATTERY CATHODES

(75) Inventor: Joseph J. Viavattine, Vadnais Heights, MN (US)

(73) Assignee: Medtronic, Inc., Minneapolis, MN (US)

( * ) Notice: Subject to any disclaimer, the term of this patent is extended or adjusted under 35 U.S.C. 154(b) by 0 days.

(21) Appl. No.: 10/978,112

(22) Filed: Oct. 29, 2004

(51) Int. Cl.
*H01G 4/005* (2006.01)
*H01M 4/00* (2006.01)

(52) U.S. Cl. .................. 361/303; 361/508; 361/528; 29/25.03; 429/162; 429/153; 607/1; 607/5

(58) Field of Classification Search ............... 361/303, 361/306.1, 329, 508–509, 512, 516, 528, 361/532, 538; 607/1, 5; 29/25.03; 429/160–165
See application file for complete search history.

(56) References Cited

U.S. PATENT DOCUMENTS 4,204,036 A * 5/1980 Cohen et al. ............... 429/152
6,699,265 B1 * 3/2004 O'Phelan et al. ............... 607/1
2004/0127952 A1 * 7/2004 O'Phelan et al. ............. 607/36
2004/0147961 A1 * 7/2004 O'Phelan et al. ............... 607/1

* cited by examiner

*Primary Examiner*—Anthony Dinkins
(74) *Attorney, Agent, or Firm*—Caroline F. Barry; Paul H. McDowall; Girma Wolde-Michael

(57) ABSTRACT

An electrode assembly in embodiments of the invention can include a unitary member formed from an electrically conductive material having a central portion, and tab and plate portions extending radially outward from the central portion. The unitary member can be folded to configure the plate portions in a stacked configuration, thereby providing an electrically connected support structure for a cathode and/or anode assembly without individual connections/welds of plates to a common connection. The elimination of multiple welds lowers the internal resistance of the electrode assembly, and improves the structural integrity. Embodiments of the invention include batteries and implantable medical devices (IMDs) which incorporate the design flexibility in the shape and contour of the electrode assembly and hence, the overall shape and design of batteries and IMDs.

30 Claims, 22 Drawing Sheets

200

PHYSIOLOGICALLY SHAPED BATTERY

COLLECTOR PLAN VIEW, BEFORE FOLDING

TOP VIEW

FOLDED PLATE ELECTRODE ASSEMBLIES FOR BATTERY CATHODES

FIELD OF THE INVENTION

The invention relates generally to electrode assemblies for use in applications such as batteries in implantable medical devices.

BACKGROUND OF THE INVENTION

Implantable medical devices are used to deliver therapy to patients suffering from a variety of conditions. Examples of implantable medical devices are implantable pacemakers and implantable cardioverter-defibrillators (ICDs), which are electronic medical devices that monitor the electrical activity of the heart and provide electrical stimulation to one or more of the heart chambers as needed. For example, a pacemaker senses an arrhythmia, i.e., a disturbance in heart rhythm, and provides appropriate electrical stimulation pulses, at a controlled rate, to selected chambers of the heart in order to correct the arrhythmia and restore the proper heart rhythm. The types of arrhythmias that may be detected and corrected by pacemakers include bradycardias, which are unusually slow heart rates, and certain tachycardias, which are unusually fast heart rates.

Implantable cardioverter-defibrillators (ICDs) also detect arrhythmias and provide appropriate electrical stimulation pulses to selected chambers of the heart to correct an abnormal heart rate or rhythm. In contrast to pacemakers, however, an ICD can deliver cardioversion and high energy defibrillation pulses that are much stronger than typical pacing pulses. This is because ICDs are generally designed to correct fibrillation and tachycardia episodes. To correct such arrhythmias, an ICD delivers a low, moderate, or high-energy therapy.

Modern pacemakers and ICDs are designed with ergonomic shapes that are relatively compliant with a patient's implant location and tend to minimize patient discomfort. As a result, the corners and edges of the devices are typically designed with relatively generous radii to present a device having smoothly contoured exterior surfaces. It is also desirable to minimize the volume occupied by the devices as well as their mass to further limit patient discomfort.

The electrical energy for the therapy delivered by an ICD is generated by delivering electrical current from a power source (battery) to charge capacitors to store energy. The capacitors are capable of rapidly discharging under computer control to deliver one or more appropriate waveforms that deliver energy via electrodes disposed in communication with a patient's heart. In order to provide timely therapy to the patient after the detection of ventricular fibrillation, for example, it is necessary to charge the capacitors with the required amount of energy as quickly as possible. Thus, the battery in an ICD must have a high rate capability to provide the necessary current to charge the capacitors. In addition, since ICDs are implanted in patients, the battery must be able to accommodate physical constraints on size and shape.

Batteries or cells are volumetrically constrained systems. The size or volume of components that go into a battery (cathode, anode, separator, current collectors, electrolyte, etc.) cannot exceed the available volume of the battery case. The arrangement of the components affects the amount or density of active electrode material contained within the battery case.

One battery suitable for use in ICDs is disclosed in U.S. Pat. No. 4,830,940 to Keister et al, which patent is incorporated herein by reference. As disclosed therein, the anode material of the battery comprises lithium and the reactive cathode material comprises silver vanadium oxide. The anode is constructed in a serpentine-like configuration with cathode plates inserted between each of the convolutions thereof on both sides thereof. The electrolyte for a lithium battery or cell is a liquid organic type which comprises a lithium salt and an organic solvent. Both the anode and the cathode plates are encapsulated in an electrically insulative separator material. An improvement to this design is disclosed in U.S. Pat. No. 5,147,737 to Post et al., in which the active material on the serpentine-type electrode is positioned so that the sections of the serpentine-like structure which do not face cathode plates do not contain anode active material.

Known high current power sources used in ICDs employ deep, prismatic, six-sided rectangular solid shapes in packaging of the electrode assemblies. Examples of such deep package shapes can be found in, e.g., U.S. Pat. No. 5,486,215 to Kelm et al., and U.S. Pat. No. 6,040,082 to Haas et. al. These prismatic cases have proven effective for housing and electrically insulating the electrode assemblies.

Conventional lithium batteries can also employ an electrode configuration sometimes referred to as the "jelly roll" design, in which the anode, cathode and separator elements are overlaid and coiled up in a spiral wound form. A strip sheet of lithium or lithium alloy comprises the anode, a cathode material supported on a charge collecting metal screen comprises the cathode, and a sheet of non-woven material separates the anode and cathode elements. These elements are combined and wound to form a spiral. Typically, the battery configuration for such a wound electrode would be cylindrical. An advantage of this design is that there need not be anode material which is not mated to cathode material in the jelly roll electrode configuration. Such designs therefore have the potential for an improved match between the cathode and anode components and improved uniformity of anode and cathode utilization during discharge.

It has also been known to adapt wound electrodes to a prismatic case configuration by departing from a true spiral winding. For example, U.S. Pat. No. 2,928,888 discloses in FIGS. 5a and 5b therein an oblong electrode assembly wound on an elongated mandrel for use in a rectangular case. Also, U.S. Pat. No. 4,051,304 discloses in FIG. 2 therein another oblong wound electrode assembly for use in a rectangular case.

U.S. Pat. No. 4,761,352 to Bakos et al. discloses yet another electrode assembly design comprising an accordion folded electrode assembly with unitary members for both the anode and cathode electrode strips. The cathode strip is approximately half the length of the anode strip and the anode strip is folded over the cathode strip to "sandwich" the cathode between two layers of the anode. The resulting form is then manually folded in an alternating series of "V" folds (best shown in FIG. 4 of the '352 patent).

There exists a need for a battery for implantable medical devices which optimizes volumetric efficiency while allowing for flexibility in designing the shape of the battery to match the contours of an implantable medical device and to fit within the available device space.

BRIEF SUMMARY OF THE INVENTION

The present invention provides an electrode assembly and methods of fabrication that in certain embodiments can include a unitary member formed from an electrically conductive material having a central portion, and tab and plate portions extending radially outward from the central portion. The unitary member can be folded to configure the plate portions in a stacked configuration, thereby providing an electrically connected support structure for a cathode and/or anode assembly without individual connections/welds of plates to a common connection. The elimination of multiple welds lowers the internal resistance of the electrode assembly, and improves the structural integrity. Embodiments of the invention include batteries and implantable medical devices (IMDs) which incorporate the design flexibility in the shape and contour of the electrode assembly and hence, the overall shape and design of batteries and IMDs.

In one embodiment, an electrode assembly is provided having a first electrode, a second electrode, a separator layer located between the first and second electrodes to prevent contact therebetween; and at least one of the first and second electrodes being formed of an electrically conductive material folded into a compact configuration, the electrically conductive material having a central portion and a plurality of generally planar tab portions extending outwardly from the central portion when the electrically conductive material is unfolded, and the central portion being folded in the compact configuration such that the tab portions generally overlap in a stacked arrangement, and the tab portions being folded in the compact configuration such that the stacked tab portions are spaced apart from each other.

In another embodiment, electrode assembly is provided having a first electrode, a second electrode, a separator located between the first and second electrodes to prevent contact therebetween, at least one of the first and second electrodes including an electrically conductive material folded into a compact configuration, the electrically conductive material having a central portion and a plurality of tab portions extending outwardly from the central portion when the electrically conductive material is unfolded, the tabs each extending into generally planar plate portions; and the central portion being folded in the compact configuration such that the plate portions are positioned to generally overlap each other in a stacked arrangement, and the tab portions being folded in the compact configuration such that the stacked plate portions are spaced apart from each other.

In one embodiment of a fabrication technique, a method of forming an electrode assembly is provided that employs the following steps. Providing an electrically conductive material having a central portion and a plurality of tab portions extending outwardly from the central portion, the tabs each having a generally planar portion. Then folding the electrically conductive material at fold locations in the central portion such that plate portions are generally overlapping with each other in a stacked arrangement, and folding the electrically conductive material at fold locations in the tab portions such that the tab portions are spaced apart from each other and are generally parallel to each other.

DETAILED DESCRIPTION OF THE ILLUSTRATED EMBODIMENTS

Figure 1:
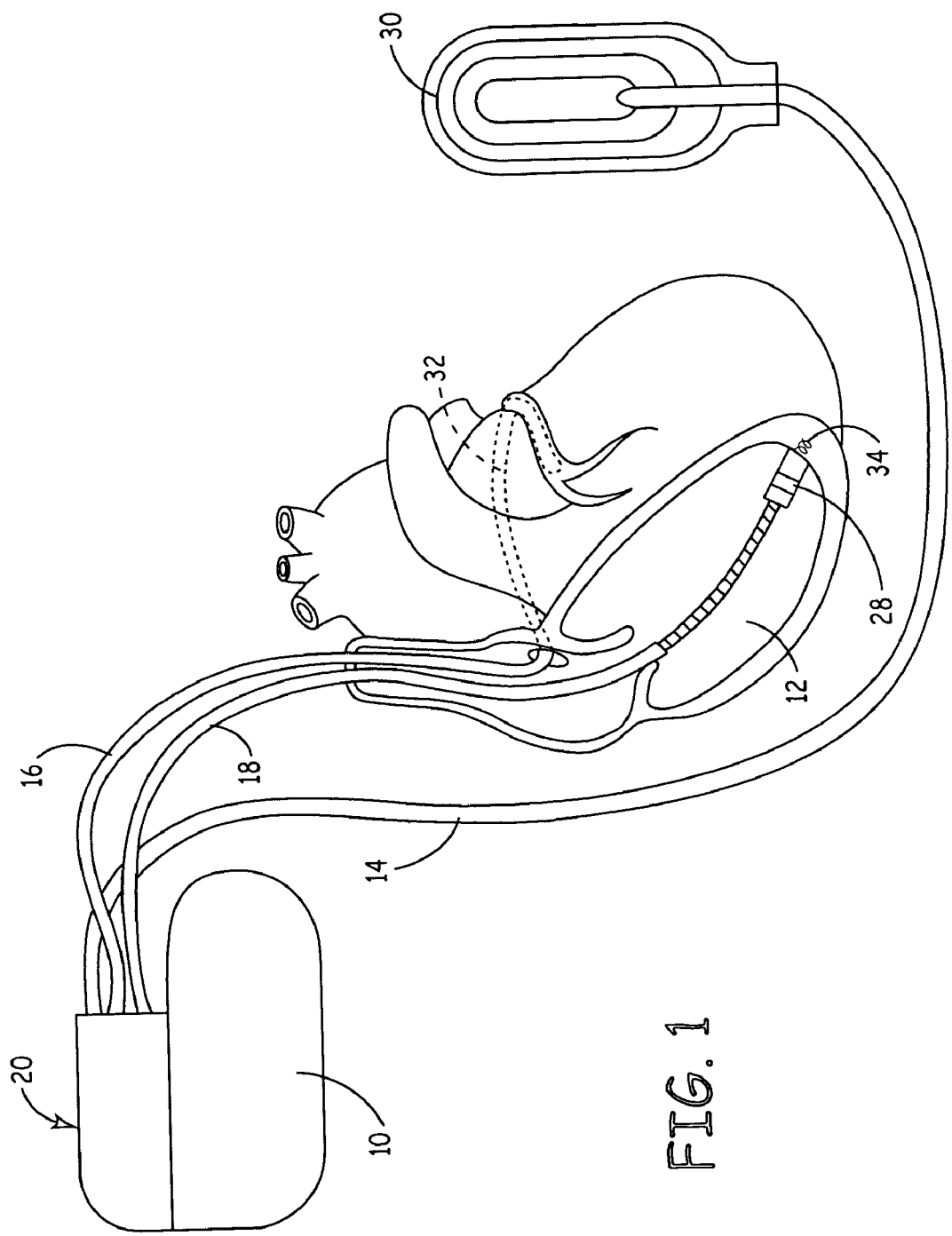
FIG. 1 is a simplified schematic view of one embodiment of an implantable medical device (IMD) incorporating an electrochemical cell.

The following discussion is presented to enable a person skilled in the art to make and use the invention. Various modifications to the illustrated embodiments will be readily apparent to those skilled in the art, and the generic principles herein may be applied to other embodiments and applications without departing from the spirit and scope of the present invention as defined by the appended claims. Thus, the present invention is not intended to be limited to the embodiments shown, but is to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the invention. Skilled artisans will recognize the examples provided herein have many useful alternatives which fall within the scope of the invention.

Embodiments of the invention are not limited to implantable cardioverter defibrillators ("ICDs"), and may be employed in many various types of electronic and mechanical devices for treating patient medical conditions such as pacemakers, neurostimulators, and therapeutic substance delivery systems. However, for purposes of illustration only, the invention is described below in the context of ICDs. It is to be further understood that the present invention is not limited to high current batteries and may be utilized for low or medium current batteries. For purposes of illustration only, however, the present invention is below described in the context of high current batteries.

FIG. 1 is a simplified schematic view of an example of an implantable medical device ("IMD") 10, in accordance with an exemplary embodiment of the present invention. The IMD 10 is shown in FIG. 1 as a pacemaker/cardioverter/defibrillator (PCD) with a relationship to the human heart. However, IMD 10 may assume a wide variety of forms. For example, IMD 10 may be an implantable cardiac defibrillator (ICD as is known in the art). Alternatively, or in addition, IMD 10 may be an implantable cardiac pacemaker, such as that disclosed in U.S. Pat. No. 5,158,078 to Bennett et al.; U.S. Pat. No. 5,312,453 to Shelton et al.; or U.S. Pat. No. 5,144,949 to Olson, all hereby incorporated by reference, each in its entirety. Even further, IMD 10 may be an implantable neurostimulator, such as that described, for example, in U.S. Pat. No. 5,342,409 to Mullet; or an implantable drug pump; a cardiomyostimulator; a biosensor; and the like.

IMD 10 includes associated electrical leads 14, 16 and 18, although it will be appreciated that IMD 10 may include any number of leads suitable for a particular application. Leads 14, 16 and 18 are coupled to IMD 10 by means of a multi-port connector block 20, which contains separate ports for each of the three leads 14, 16, and 18. Lead 14 is coupled to a subcutaneous electrode 30, which is intended to be mounted subcutaneously in the region of the left chest. Alternatively, or additionally, an active "can" configuration may be employed in which the housing of IMD 10 may serve as an electrode. Lead 16 is a coronary sinus lead employing an elongated coil electrode that is located in the coronary sinus and great vein region of a heart 12. The location of the electrode is illustrated in broken line format at 32, and extends around heart 12 from a point within the opening of the coronary sinus to a point in the vicinity of the left atrial appendage.

Lead 18 may be provided with elongated electrode coil 28, which may be located in the right ventricle of heart 12. Lead 18 may also include a helical stimulation electrode 34, which takes the form of an advanceable helical coil that is screwed into the myocardial tissue of the right ventricle. Lead 18 may also include one or more additional electrodes for near and far field electrogram sensing.

In the system illustrated, cardiac pacing pulses are delivered between the helical electrode 34 and the elongated electrode coil 28. The electrodes 28 and 34 are also employed to sense electrical signals indicative of ventricular contractions. As illustrated, it is anticipated that the right ventricular electrode 28 will serve as the common electrode during sequential and simultaneous pulse multiple electrode defibrillation regimens. For example, during a simultaneous pulse defibrillation regimen, pulses would simultaneously be delivered between electrode 28 and electrode 30, and between electrode 28 and electrode 32. During sequential pulse defibrillation, it is envisioned that pulses would be delivered sequentially between subcutaneous electrode 30 and electrode 28, and between coronary sinus electrode 32 and right ventricular electrode 28. Single pulse, two electrode defibrillation pulse regimens may also be provided, typically between electrode 28 and coronary sinus electrode 32. Alternatively, single pulses may be delivered between electrodes 28 and 30. The particular interconnection of the electrodes to the IMD 10 will depend somewhat on which specific single electrode pair defibrillation pulse regimen is believed more likely to be employed.

Figure 2:
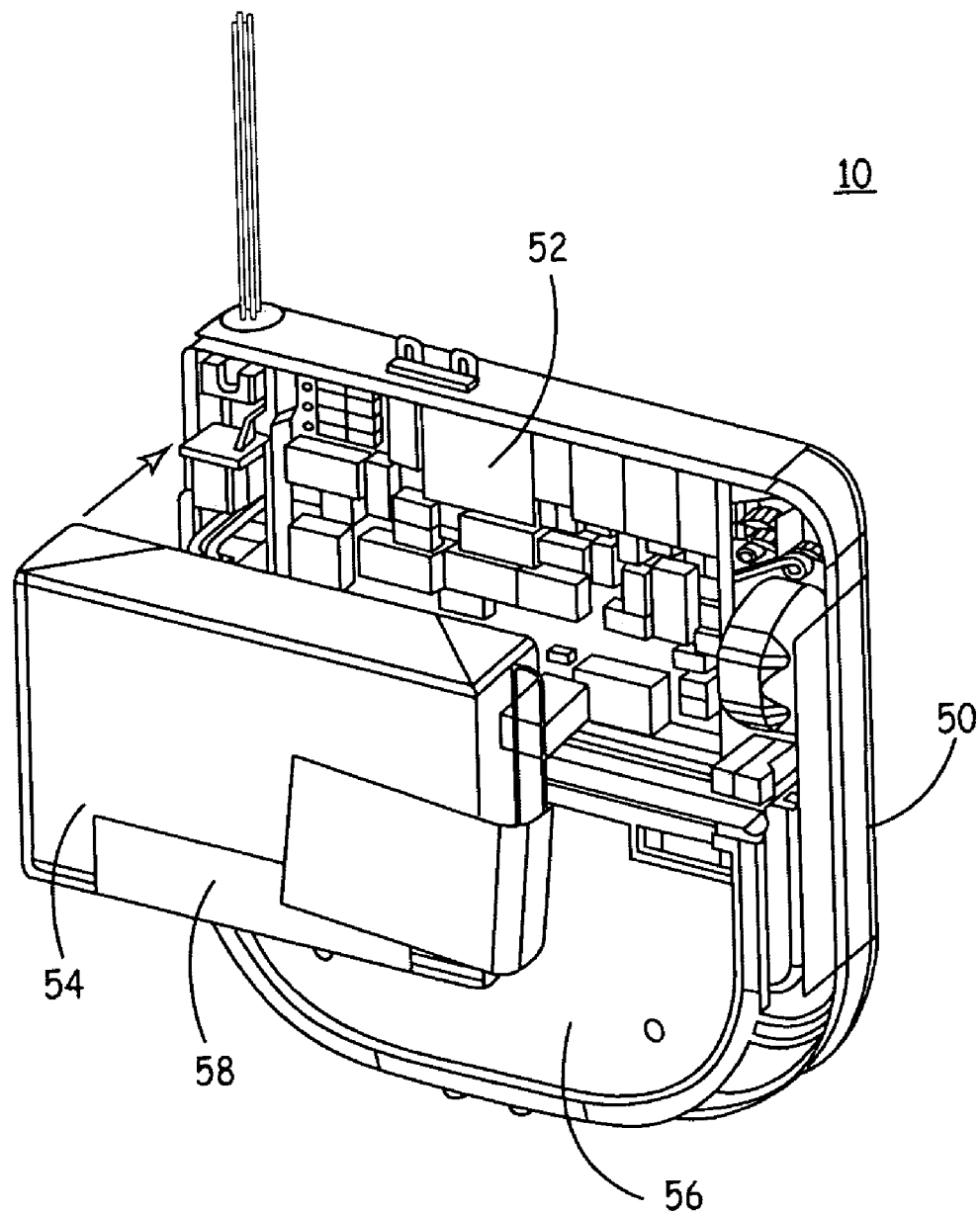
FIG. 2 is an exploded perspective view of various components, including an electrochemical cell, disposed within the housing of one embodiment of an IMD.

As previously described, IMD 10 may assume a wide variety of forms as are known in the art. One example of various components of an IMD 10 is shown in FIG. 2. IMD 10 includes a case 50 (the right-hand side of which is shown in FIG. 2), an electronics module 52, a battery or electrochemical cell 54, and capacitor(s) 56. Each of the components of the IMD 10 is preferably configured for the particular end-use application. Thus, the electronics module 52 is configured to perform one or more sensing and/or stimulation processes. Electrochemical cell 54 includes an insulator 58 disposed therearound. Electrochemical cell 54 provides the electrical energy to charge and re-charge the capacitor(s) 56, and also powers the electronics module 52.

Figures 3, 4:
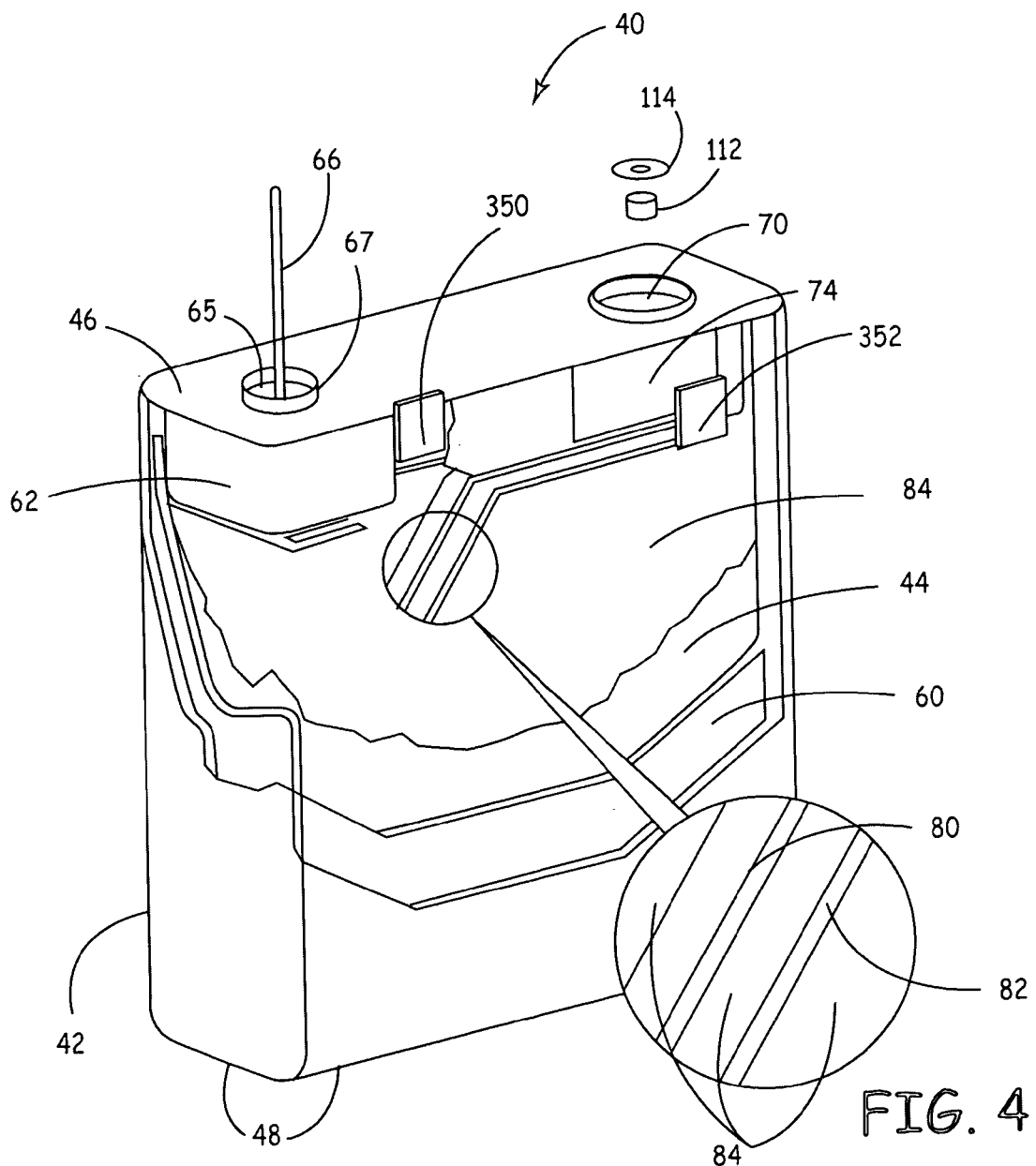
FIG. 3 is a cutaway perspective view of a battery case, electrode assembly, case liner, coil insulator, battery cover, and a headspace insulator in an embodiment according to the present invention.
FIG. 4 is an enlarged cutaway perspective view of the electrode assembly shown in FIG. 3.

With reference to FIG. 3, an exploded perspective view of a deep drawn battery case in an embodiment according to the present invention is shown. A battery 40 according to the present invention includes a long drawn battery case 42 and an electrode assembly 44. Case 42 is generally made of a medical grade titanium, however, it is contemplated that case 42 could be made of almost any type of metal such as aluminum and stainless steel, as long as the metal is compatible with the battery's chemistry in order to prevent corrosion. Further, it is contemplated case 42 could be manufactured from most any process including but not limited to machining, casting, drawing, or metal injection molding. In some embodiments, case 42 is made of non-conductive materials, such as plastic. Case 42 is designed to enclose electrode assembly 44 and be sealed by a battery cover 46. While sides 48 of case 42 are generally planar it is contemplated sides 48 could be generally arcuate in shape. This construction would provide a number of advantages including the ability to accommodate a curved or arcuate electrode assembly 44. Arcuate sides could also nest within an arcuate edge of an implantable medical device such as an implantable cardiac defibrillator.

Figure 6:
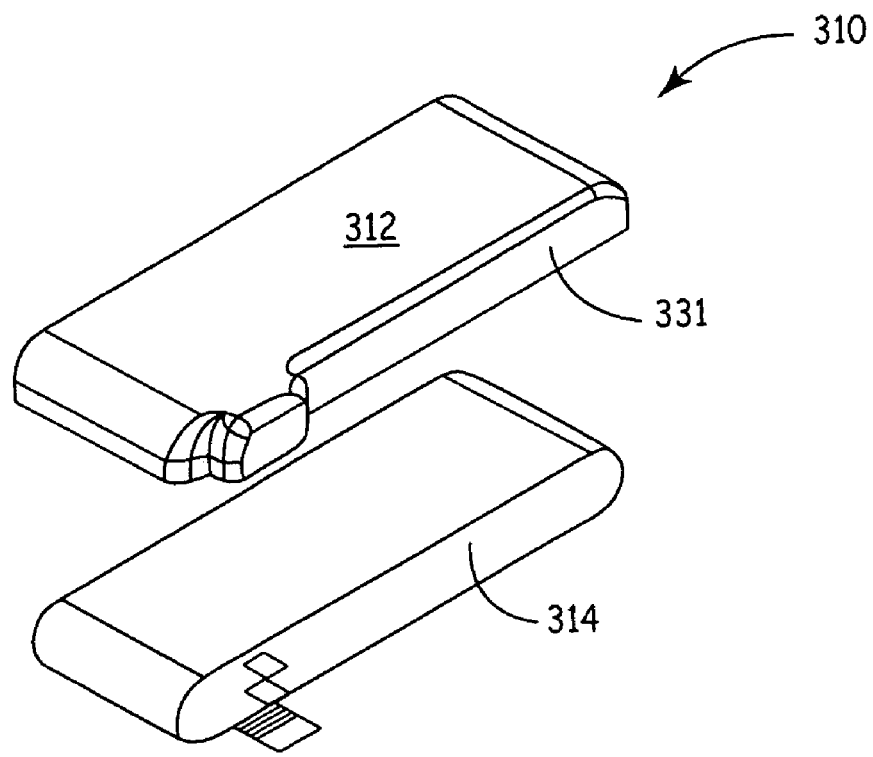
FIG. 6 is an exploded perspective view of a shallow drawn battery according to an embodiment of the present invention.
Figure 6:
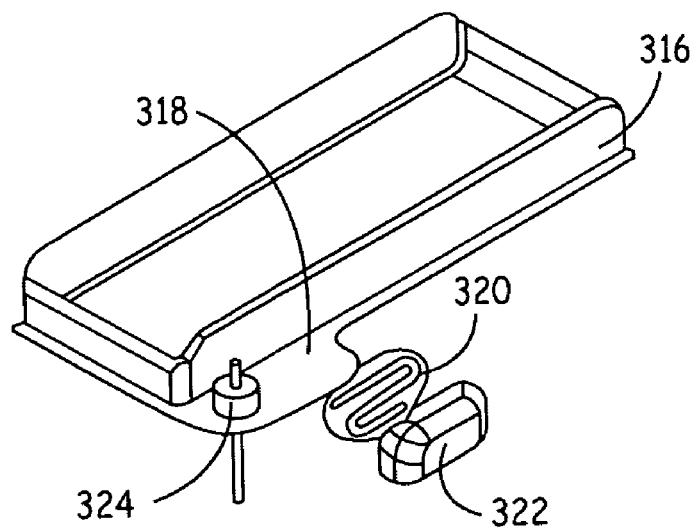

In contrast to deep cases, battery case 42 may also be manufactured using a shallow form process. With reference to FIG. 6, an exploded perspective view of a shallow drawn battery according to an embodiment of the present invention is shown. Battery 310 is comprised of a shallow drawn battery case 312, electrode assembly 314, insulator cup 316, battery cover 318, coupling 320, headspace cover 322, feedthrough assembly 324, and battery case liner 331. The battery case 312 is designed to enclose the electrode assembly 314 and be hermetically sealed with battery cover 318. Embodiments of the invention may be used in either deep cases or shallow drawn cases without departing from the scope of the invention.

As used herein, the terms battery or batteries include a single electrochemical cell or cells. Batteries are volumetrically constrained systems in which the components in the case of the battery cannot exceed the available volume of the battery case. Furthermore, the relative amounts of some of the components can be important to provide the desired amount of energy at the desired discharge rates. A discussion of the various considerations in designing the electrodes and the desired volume of electrolyte needed to accompany them in, for example, a lithium/silver vanadium oxide (Li/SVO) battery, is discussed in U.S. Pat. No. 5,458,997 (Crespi et al.). Generally, however, the battery must include the electrodes and additional volume for the electrolyte required to provide a functioning battery.

Most embodiments of the present invention are particularly directed to high current batteries that are capable of charging capacitors with the desired amount of energy, typically between about 20 joules to about 35 joules, in the desired amount of time, (e.g., about 10–15 seconds or less). As a result, the batteries must typically deliver up to about 5 amps at about 1.5 to about 2.5 volts, in contrast to low rate batteries that are typically discharged at much lower currents. Furthermore, batteries providing this high current must be able to provide these amounts of energy repeatedly, separated by about 30 seconds or less or, in some cases within about 10 seconds or less.

Electrode assemblies 44 and 314 may include spirally-wound, stacked plate, or serpentine electrodes of the type disclosed, for example, in U.S. Pat. Nos. 5,312,458 and 5,250,373 to Muffuletto et al. for "Internal Electrode and Assembly Method for Electrochemical Cells;" U.S. Pat. No. 5,549,717 to Takeuchi et al. for "Method of Making Prismatic Cell;" U.S. Pat. No. 4,964,877 to Kiester et al. for "Non-Aqueous Lithium Battery;" U.S. Pat. No. 5,147,737 to Post et al. for "Electrochemical Cell With Improved Efficiency Serpentine Electrode;" and U.S. Pat. No. 5,468,569 to Pyszczek et al. for "Use of Standard Uniform Electrode Components in Cells of Either High or Low Surface Area Design," the disclosures of which are hereby incorporated by reference herein in their respective entireties. Alternatively, electrochemical cell 54 can include a single cathode electrode as described, for example, in U.S. Pat. No. 5,716,729 to Sunderland et al. for "Electrochemical Cell," which is hereby incorporated by reference in its entirety. The composition of the electrode assemblies can vary. One illustrated electrode assembly includes a core of lithium/silver vanadium oxide (Li/SVO) as discussed in, e.g., U.S. Pat. No. 5,458,997 (Crespi et al.). Other battery chemistries are also anticipated, such as those described in U.S. Pat. No. 5,180,642 (Weiss et al) and U.S. Pat. Nos. 4,302,518 and 4,357,215 (Goodenough et al).

With reference to FIG. 4, a cutaway perspective view of the electrode assembly as shown in FIG. 3 is shown. Electrode assembly 44 generally includes a first electrode 82, a second electrode 80, and a porous, electrically non-conductive separator material 84 encapsulating either or both of the electrodes 80, 82. These three components are generally placed together to form electrode assembly 44. Second electrode 80 of electrode assembly 44 can comprise a number of different materials including second electrode active material located on a second electrode conductor element or current collector.

In one embodiment, the second electrode is an anode in the case of a primary cell or the negative electrode in the case of a rechargeable cell. Examples of suitable electrode active materials include, but are not limited to: alkali metals, materials selected from Group IA of the Periodic Table of Elements, including lithium, sodium, potassium, etc., and their alloys and intermetallic compounds including, e.g., Li—Si, Li—B, and Li—Si—B alloys and intermetallic compounds, insertion or intercalation materials such as carbon, or tin-oxide. Examples of suitable materials for the anode current collector include, but are not limited to: stainless steel, nickel, titanium, or aluminum. Further, the current collector may have a grid configuration, a perforated pattern, or a "solid grid" design. In one embodiment, the anode is comprised of lithium with a titanium current collector. In various embodiments, the anode active material can be pressed into a mesh or etched current collector, or onto the surface of a current collector, or be of pure lithium and have no current collector. In one embodiment, a sheet of lithium is attached to a current collector and then die cut to the desired shape.

First electrode portion 82 of electrode assembly 44 generally includes a first electrode active material located on a first electrode current collector, which also conducts the flow of electrons between the first electrode active materials, and first electrode terminals of electrode assembly 44. In one embodiment, the first electrode is a cathode in the case of a primary cell or the positive electrode in the case of a rechargeable cell. Examples of materials suitable for use as first electrode active material include, but are not limited to: a metal oxide, a mixed metal oxide, a metal, and combinations thereof. Suitable first electrode active materials include silver vanadium oxide (SVO), copper vanadium oxide, copper silver vanadium oxide (CSVO), manganese dioxide, titanium disulfide, copper oxide, copper sulfide, iron sulfide, iron disulfide, and fluorinated carbon, and mixtures thereof, including lithiated oxides of metals such as manganese, cobalt, and nickel.

Generally, cathode or positive electrode active material comprises a mixed metal oxide formed by chemical addition, reaction or otherwise intimate contact or by thermal spray coating process of various metal sulfides, metal oxides or metal oxide/elemental metal combinations. The materials thereby produced contain metals and oxides of Groups IB, IIB, IIIB, IVB, VB, VIIB, VIIB, and VIII of the Periodic Table of Elements, which includes noble metals and/or their oxide compounds.

First cathode and positive electrode materials can be provided in a binder material such as a fluoro-resin powder, generally polyvinylidine fluoride or polytetrafluoroethylene (PTFE) powder also includes another electrically conductive material such as graphite powder, acetylene black powder, and carbon black powder. In some cases, however, no binder or other conductive material is required for the first electrode. In one embodiment, the cathode material can be a powder which is pressed into a mesh current collector. In one embodiment, a cathode paste can be provided which can be laminated, pressed, rolled, or otherwise mounted onto the surface of a current collector. The cathode current collector may be comprised of the same materials and configured similar to that described above for the anode current collector.

It is to be understood that electrochemical systems other than those set forth explicitly above may also be employed in conjunction with the present invention, including, but not limited to, cathode/anode systems such as: silver oxide/lithium; manganese oxide/lithium; $V_2O_5$/lithium; copper silver vanadium oxide/lithium; copper oxide/lithium; lead oxide/lithium; carbon monofluoride/lithium; chromium oxide/lithium; bismuth-containing oxides/lithium; copper sulfate/lithium; mixtures of various cathode materials listed above such as a mixture of silver vanadium oxide and carbon monofluoride; and lithium ion rechargeable batteries, to name but a few.

Separator material 84 electrically insulate second electrode 80 from first electrode 82. The material is generally wettable by the cell electrolyte, sufficiently porous to allow the electrolyte to flow through separator material 84, and maintain physical and chemical integrity within the cell during operation. Examples of suitable separator materials include, but are not limited to: polyethylenetetrafluoroethylene, ceramics, non-woven glass, glass fiber material, polypropylene, and polyethylene. As illustrated, separator 84 includes three layers. A polyethylene layer is sandwiched between two layers of polypropylene. The polyethylene layer has a lower melting point than the polypropylene and provides a shut down mechanism in case of cell over heating. The electrode separation is different than other lithium-ion cells in that two layers of separator are used between second electrode 80 and first electrode 82.

As illustrated, the electrolyte solution can be an alkali metal salt in an organic solvent such as a lithium salt (i.e. 1.0M $LiClO_4$ or $LiAsF_6$) in a 50/50 mixture of propylene carbonate and dimethoxyethane.

Figure 5:
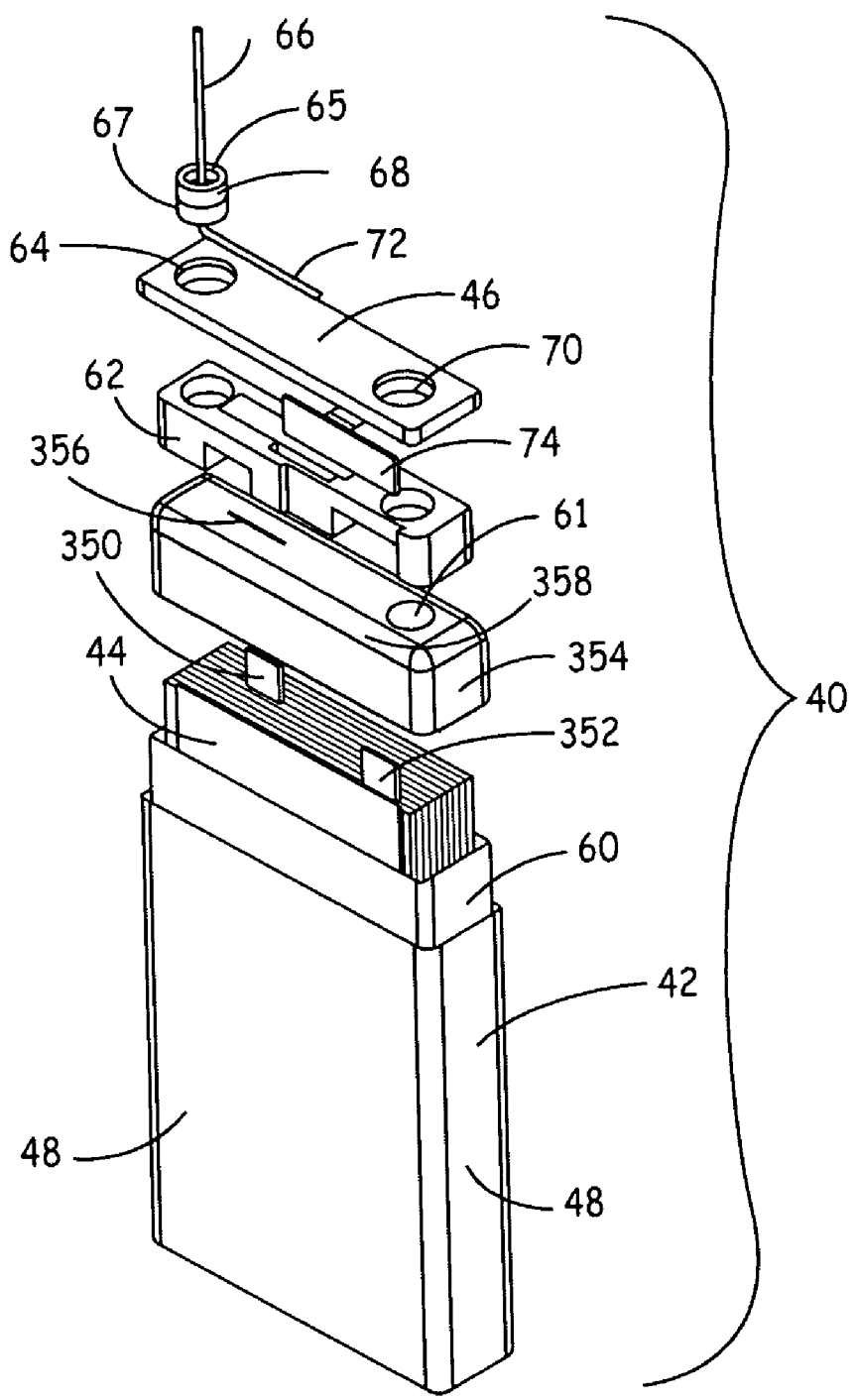
FIG. 5 is an exploded perspective view of a deep drawn battery, including the battery case, electrode assembly, case liner, coil insulator, battery cover, and a headspace insulator in an embodiment according to the present invention.

As best seen in FIG. 5, an insulator 354 is located on electrode assembly 44 when assembled, which is discussed in more detail below. Insulator 354 includes slits 356 and 358 to accommodate first electrode tab 352 and second electrode tab 350. As detailed below, tabs 350, 352 may connect to an electrically connected support structure for the electrodes without requiring individual connections/welds of the electrodes to a common connection. Insulator 354 further includes aperture 61 allowing electrolyte to enter and surround electrode assembly 44. Generally insulator 354 is comprised of ETFE, however, it is contemplated other materials could be used such as HDDE, polypropylene, polyurethane, fluoropolymers, and the like. Insulator 354 performs several functions including working in conjunction with case liner 60 to isolate case 42 and cover 46 from electrode assembly 44. It also provides mechanical stability for electrode assembly 44.

Electrode assembly 44 is also generally inserted into an electrically non-conductive case liner 60 during assembly. Case liner 60 generally extends at its top edge above the edge of electrode assembly 44 to overlap with insulator 354. Case liner 60 is generally comprised of ETFE, however, other types of materials are contemplated such as polypropylene, silicone rubber, polyurethane, fluoropolymers, and the like. Case liner 60 generally has substantially similar dimensions to case 42 except case liner 60 would have slightly smaller dimensions so it can rest inside of battery case 42.

FIGS. 3 and 5 also depict battery cover 46 and a headspace insulator 62 along with case 42 and electrode assembly 44. Similar to case 42, cover 46 is comprised of medical grade titanium to provide a strong and reliable weld creating a hermetic seal with battery case 42. However, it is contemplated cover 46 could be made of any type of material as long as the material was electrochemically compatible.

Illustrated battery cover 46 includes a feedthrough aperture 64 through which feedthrough assembly 68 is inserted. Feedthrough assembly contains a ferrule 67, an insulating member 65, and a feedthrough pin 66. Feedthrough pin 66 is comprised of niobium; however, any conductive material could be utilized without departing from the spirit of the invention. Niobium is generally chosen for its low resistivity, its material compatibility during welding with titanium, and its coefficient of expansion when heated. Niobium and titanium are compatible metals, meaning when they are welded together a strong reliable weld is created.

Feedthrough pin 66 is generally conductively insulated from cover 46 by feedthrough assembly 68 where it passes through cover 46. Insulating member 65 is comprised of CABAL-12 (calcium-boro-aluminate), TA-23 glass or other glasses, which provides electrical isolation of feedthrough pin 66 from cover 46. The pin material is in part selected for its ability to join with insulating member 65, which results in a hermetic seal. CABAL-12 is very corrosion resistant as well as a good insulator. Therefore, CABAL-12 provides for good insulation between pin 66 and cover 46 as well as being resistant to the corrosive effects of the electrolyte. However, other materials besides glass can be utilized, such as ceramic materials, without departing from the spirit of the invention. Battery cover 46 also includes a fill port 70 used to introduce an appropriate electrolyte solution after which fill port 70 is hermetically sealed by any suitable method.

Headspace insulator 62 is generally located below battery cover 46 and above insulator 354, i.e., in the headspace above electrode assembly 44 and below the cover 46. Generally, headspace insulator 62 is comprised of ETFE (Ethylene Tetrafluoroethylene), however, other insulative materials are contemplated such as polypropylene. ETFE is stable at both second electrode 80 and first electrode 82 potentials and has a relatively high melting temperature. Headspace insulator 62 preferably covers distal end 72 of feedthrough pin 66, first electrode tab 352, and second electrode tab 350. While electrode assembly 44 is described as having a first and second electrode tab, it is fully contemplated each electrode could have a plurality of tabs without departing from the spirit of the invention. Insulator 62 is designed to provide thermal protection to electrode assembly 44 from the weld joining case 42 and cover 46 by providing an air gap between the headspace insulator and the cover in the area of the case to cover weld. Insulator 62 prevents electrical shorts by providing electrical insulation between the first electrode tab 352, second electrode tab 350, and bracket 74 and their conductive surfaces. Illustrated weld bracket 74 serves as conductor between first electrode tab 352 and battery cover 46. Weld bracket 74 is a nickel foil piece that is welded to both cover 46 and first electrode tab 352.

Battery 40 in FIGS. 3 and 5 can be thought of as including three major functional portions. They are the encasement, insulation, and active component portions. The encasement or closure portion comprises of case 42, cover 46, feedthrough assembly 68, fillport 70, ball 112, button 114, and electrical connections. The major functions of the encasement are to provide a hermetic seal, a port for adding electrolyte and isolated electrical connections. The major function of the insulators is to prevent electrical shorts. The insulators include headspace insulator 62, coil insulator 354, and case liner 60. The active portion of the cell is where the electrochemistry/energy storage occurs. It includes the electrolyte and electrode assembly 44. Electrode assembly 44 includes second electrode 80, first electrode 82, and two layers of separator 84.

The resulting battery 40 may be formed as a case negative electrical configuration, i.e. the second electrode 80 (anode) may be electrically connected to the conductive casing 42 serving as the negative polarity external electrical connection for the battery 40, and feedthrough terminal pin 66 may be connected to the first electrode 82 (cathode) serving as the positive external electrical connection for the battery 40. Alternately, the first and second electrode 82, 80 connections can be reversed, resulting in a case positive electrical configuration. Also, a case neutral configuration may be obtained by using two feedthrough pins 66 for the first and second electrode 82, 80 connections. In the case neutral configuration, the case may be made of conductive materials or non-conductive materials.

As noted above, the first and second electrode 82, 80 portions may each include a current collector portion to which active anode or active cathode material may be applied. In accordance with an embodiment of the invention, a current collector is described which allows multiple plates of an anode and/or cathode to be electrically connected, eliminating the need for multiple welds and the problems associated therewith (higher internal resistance, weaker structural integrity, etc.), while allowing great flexibility in the design of the shape of an electrochemical cell.

Figure 7A:
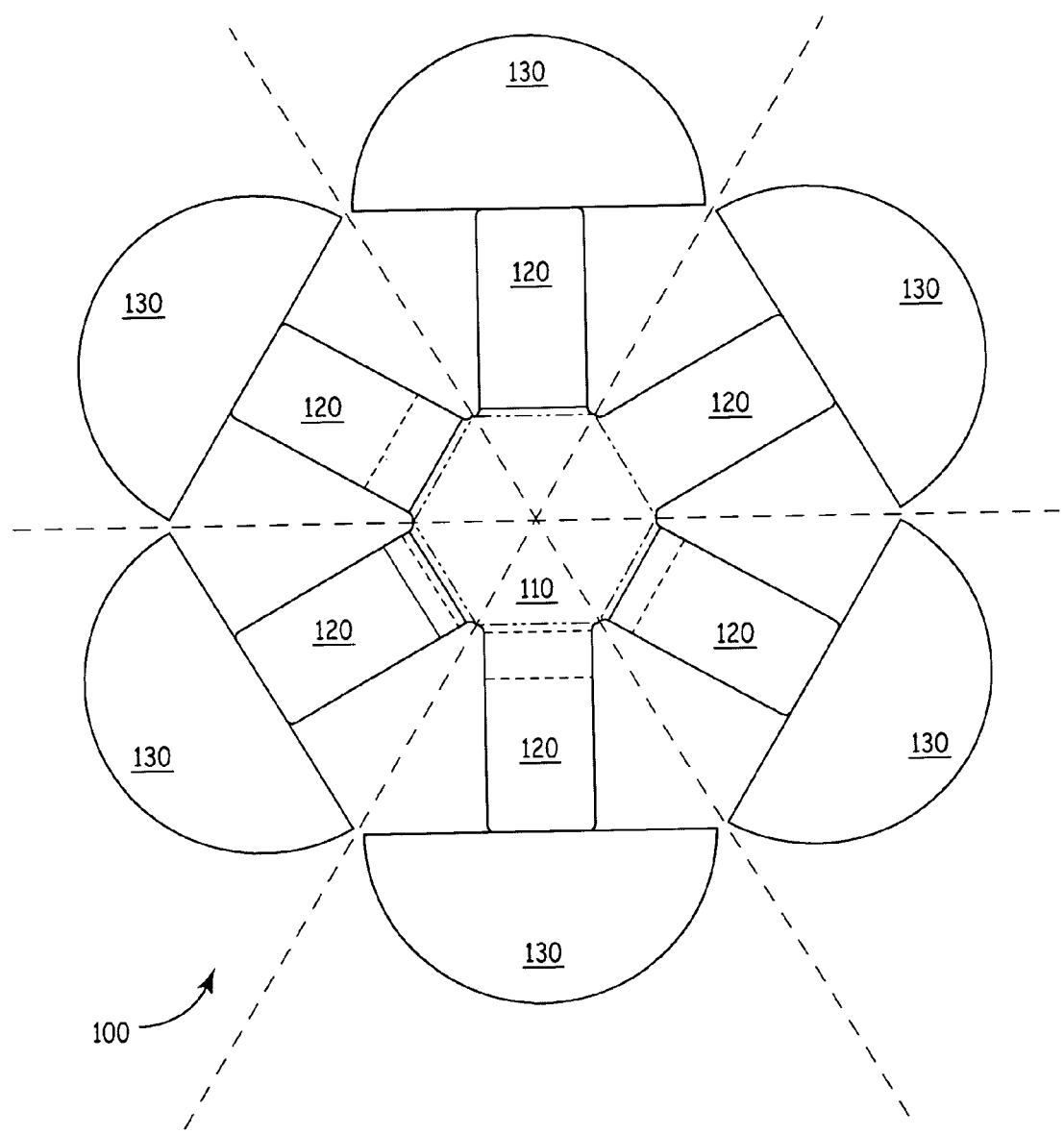
FIG. 7(a) is a top plan view of a current collector for an electrode assembly according to an embodiment of the present invention.
Figure 8A:
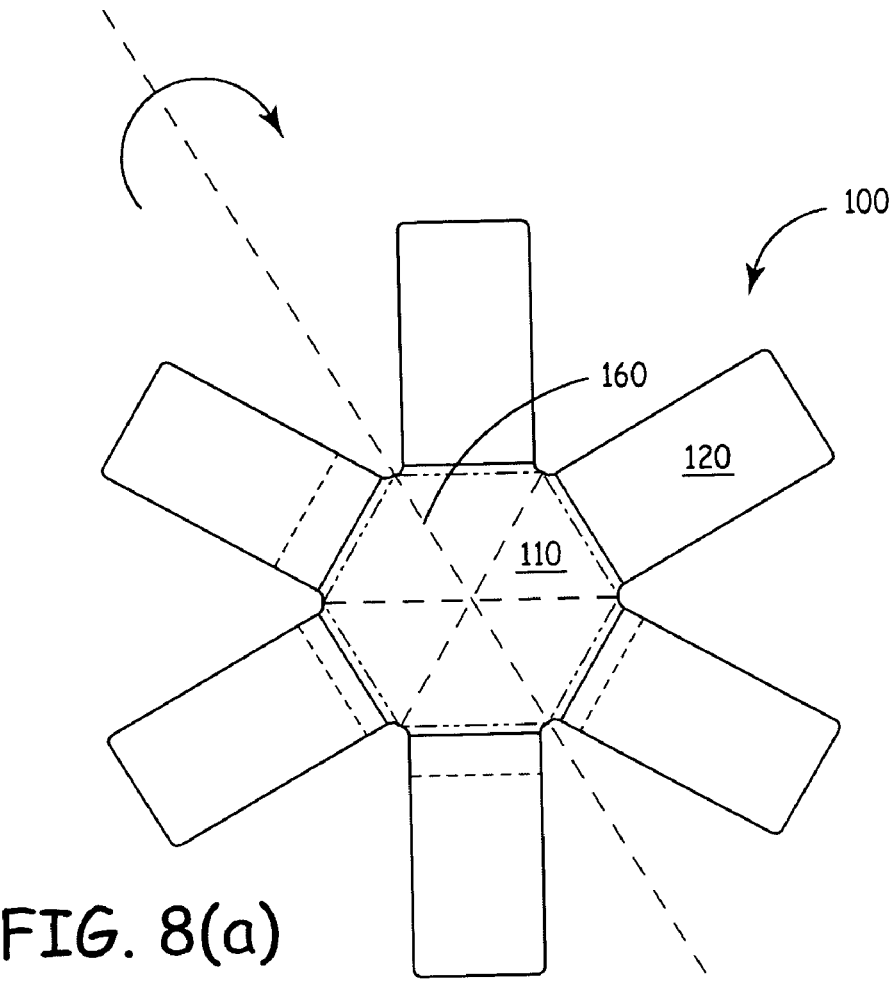
FIGS. 8(a)–(c) are top plan views of a sequence of folding steps to form a current collector for an electrode assembly according to an embodiment of the present invention.
Figure 8B:
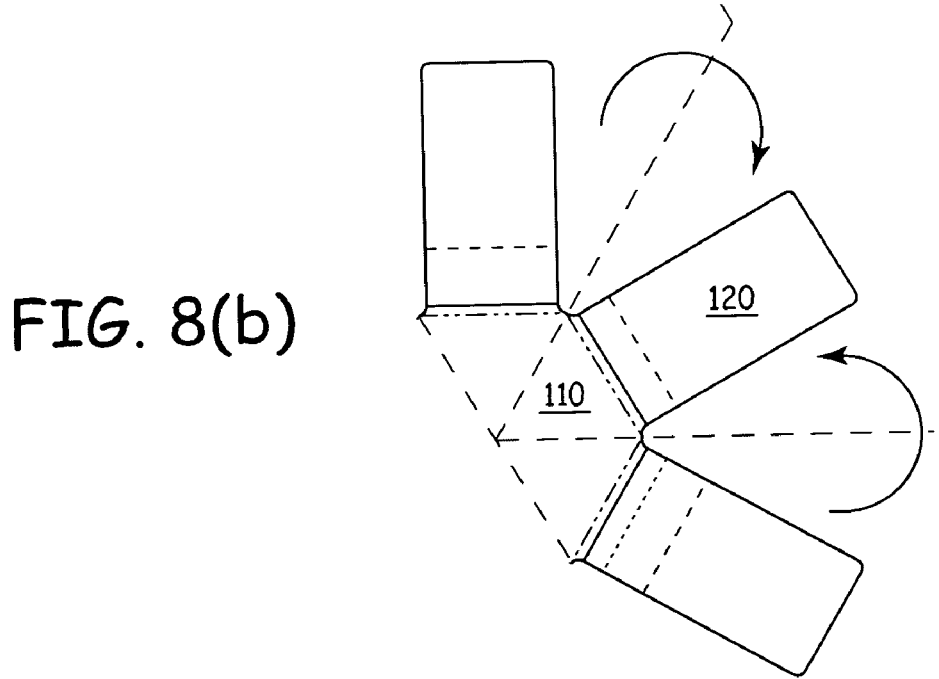
Figure 8C:
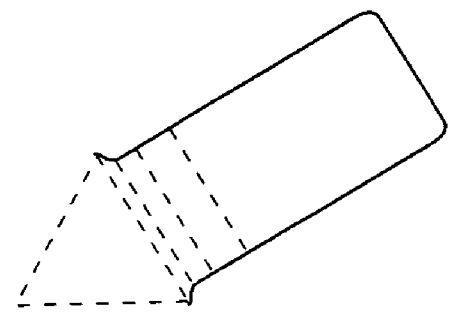

Referring now to FIGS. 7(a) and (b), a current collector 100 for supporting and/or connecting a plurality of cathode or anode plate portions in a stacked configuration is illustrated in accordance with one embodiment of the invention. The current collector may be formed from a single piece of a conductive material, such as a metal, which may be folded as shown in FIGS. 8(a)–(c) to form a stacked electrode assembly configuration. Titanium may be suitably employed as the material for the current collector 100, although any conductive material with the desired mechanical and electrical properties will suffice. Partial etching of one or both sides of the current collector 100 may be employed to facilitate bending and folding of the current collector 100 at predetermined locations.

FIG. 7(a) shows an embodiment of the invention in which the current collector 100 includes a central portion 110, a plurality of tab portions 120 extending generally radially outwardly from the central portion 110, and a plurality of plate portions 130 extending from the tab portions 120. In one embodiment, the central portion 110, tab portions 120, and plate portions 130 are formed from a single piece of a conductive material, cut to the desired size and shape. A metal, such as titanium, may be used for this purpose.

Figure 7B:
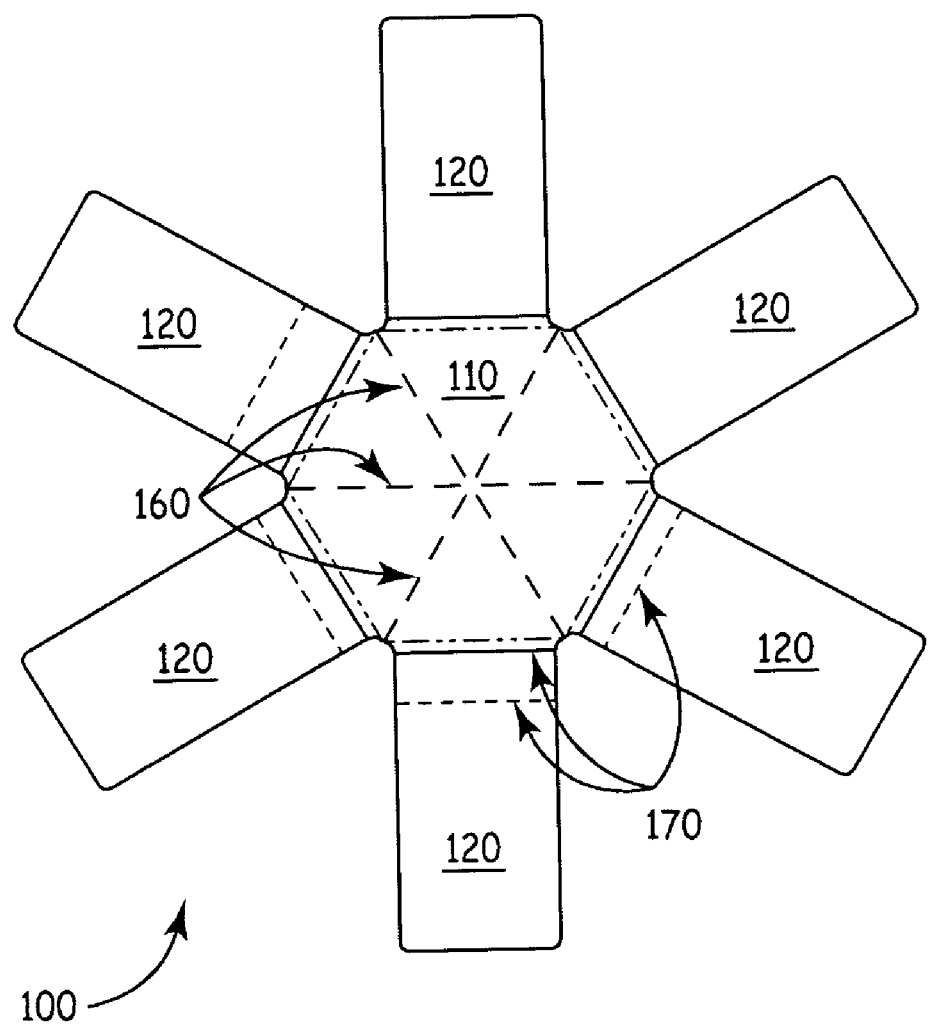
FIG. 7(b) is a top plan view of a current collector for an electrode assembly according to another embodiment of the present invention.

FIG. 7(b) shows an alternate embodiment of the invention in which the central portion 110 and tab portions 120 of the current collector are formed from a single piece of a conductive material, and the plate portions (not shown) are connected to the tab portions 120. FIG. 7(b) also illustrates the positioning of fold locations 160, 170 on the central portion 110 and tab portions 120, respectively.

Figure 9A:
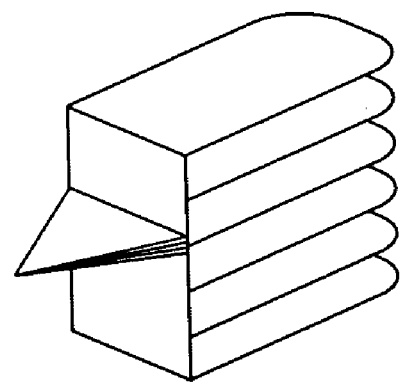
FIGS. 9(a) and (b) are perspective views of a current collector for an electrode assembly folded according to embodiments of the present invention.

FIGS. 8(a)–(c) illustrate current collector 100 being folded using fold locations 160 in the central portion 110 to form a stacked arrangement for the anode and/or cathode portions of an electrode assembly. As shown in FIGS. 9(a) and (b), folding the tab portions 120 at fold locations 170 may result in the tab portions 120 being generally parallel to each other and spaced apart in a stacked configuration. The tab portions 120 may be operatively connected to the cathode and/or anode plate portions (not shown). In one embodiment, a single-piece current collector construction includes integral plate portions 130 and thereby eliminates the need for multiple welds to electrically connect the plates. The elimination of welds reduces the resistance between plates and improves the reliability of the electrode assembly. The folded plate construction may also allow for more flexibility in designing the shape of an electrochemical cell, especially as compared to existing coiled electrode designs.

Figure 22:
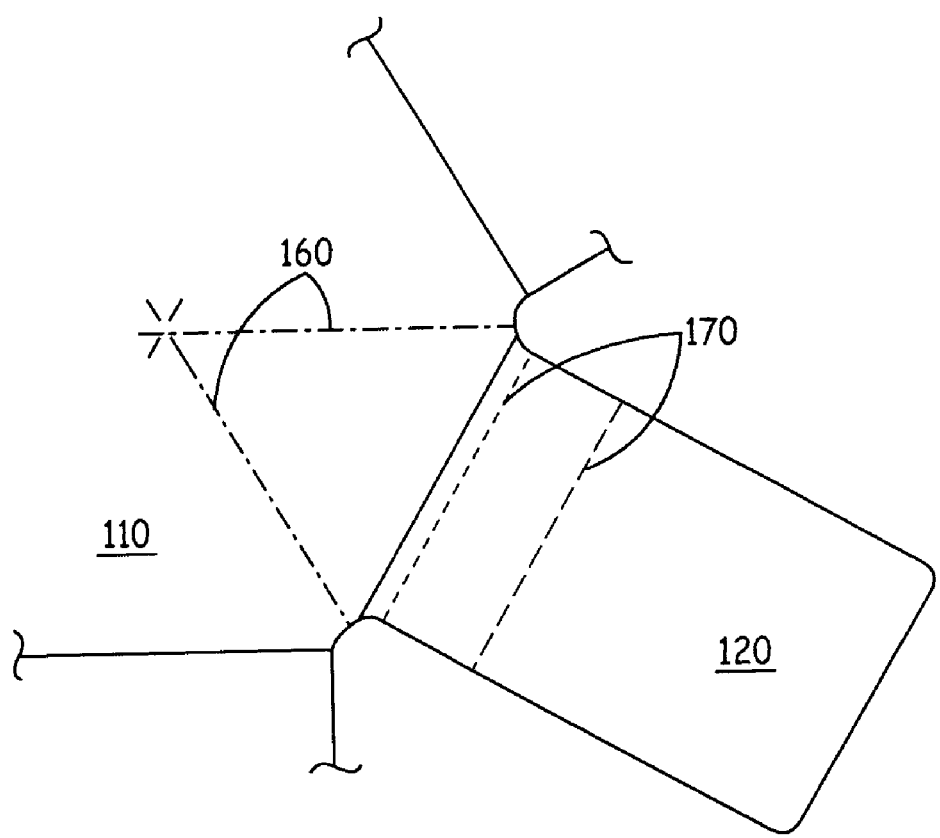
FIG. 22 is a top plan view of a portion of a current collector for use in an electrode assembly according to an embodiment of the invention.
Figure 23:
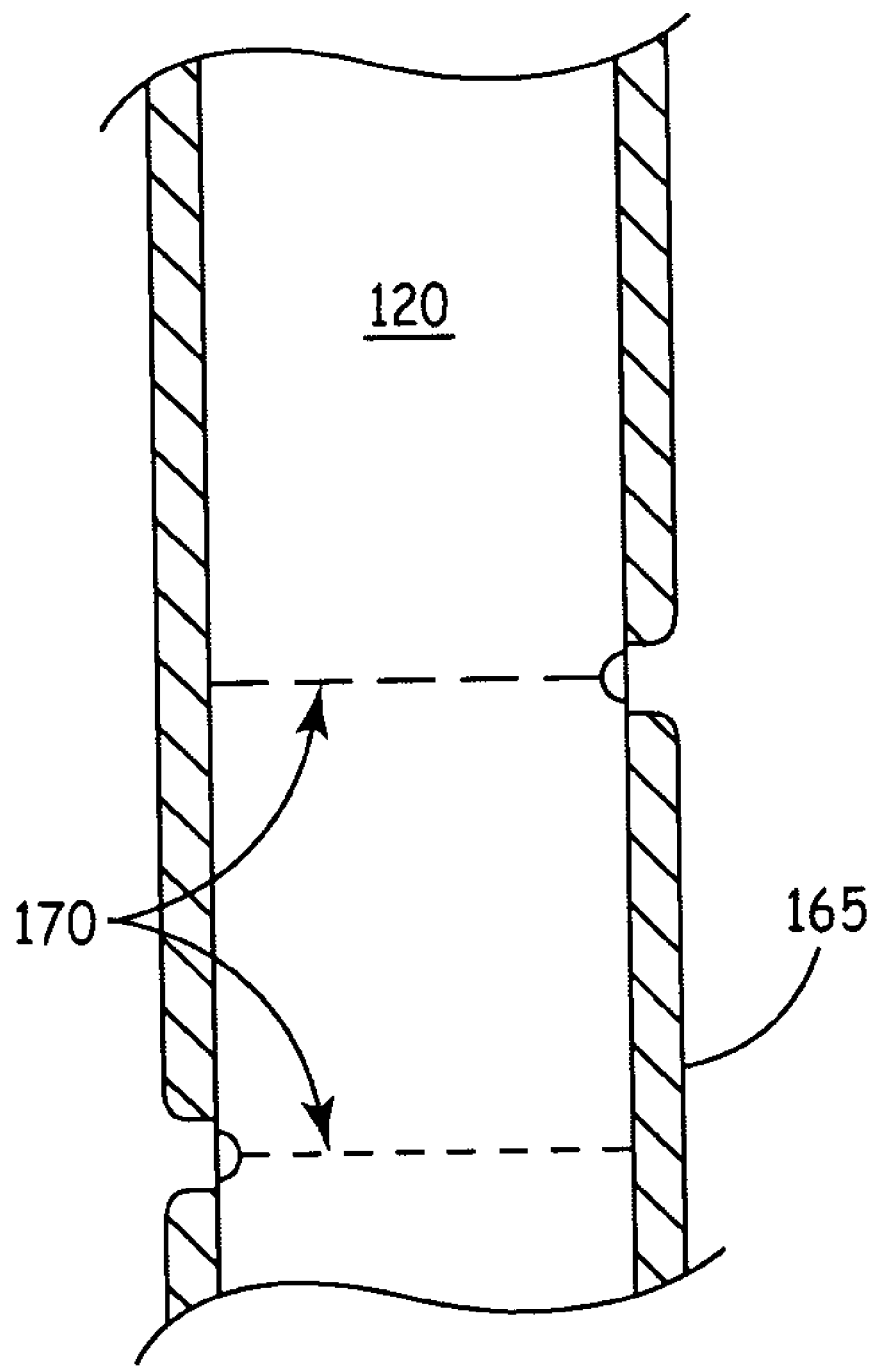
FIG. 23 is a cut-away side view of a portion of a current collector for use in an electrode assembly according to an embodiment of the invention.

In one embodiment, the fold locations 160, 170 may include etching of the current collector 100 to facilitate folding of the central portion 110 and tab portions 120. For example, FIG. 22 is an enlarged representation of the current collector shown in FIG. 7(a), indicating a pattern for etching the current collector 100 along the fold locations 160, 170. Etching may be performed, for example, by a chemical etching process whereby a mask is applied to one or both sides of the current collector, and a chemical is applied and washed away to remove a small amount of the surface of current collector 100. FIG. 23 shows an enlarged side view of a tab portion 120 which has mask material 165 applied to both sides, with exposed areas indicating fold locations 170 on tab portion 120. The chemical etching on opposite sides of tab portion 120 as shown in FIG. 23 facilitates folding in opposite directions, as may be desired to form a stacked configuration. In some embodiments, the etching process may be applied to both sides of a single fold location 160, 170, for example, to further facilitate the bending and folding of the current collector 100 material. As would be appreciated by one of ordinary skill in the art, the etching of fold locations 160, 170 may be performed by a process other than chemical etching, such as laser etching, scoring or stamping of the current collector 100 material.

Figure 9B:
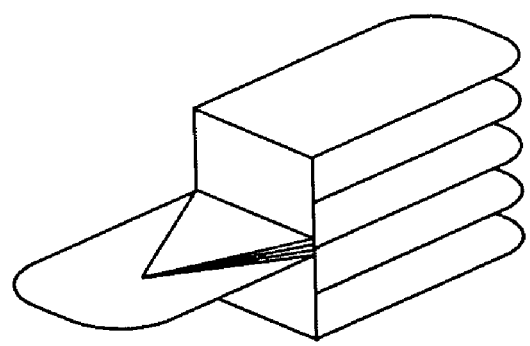

In the embodiments shown in FIGS. 7(a) and (b), current collector 100 has a central portion 110 with six sides, and six tab portions 120 extending radially outwardly. Some or all of the tab portions 120 may be adapted to include, or operatively connect to, plate portions 130 for supporting cathode or anode plates. In the embodiment illustrated in FIG. 9(b), the central portion 110 has six sides with six tab portions 120 extending radially outward therefrom, five of which are adapted to include or operatively connect to plate portions 130, the sixth being adapted for welding to an electrical feedthrough terminal or to the battery case (shown in FIGS. 3 and 5). Alternatively, the embodiment illustrated in FIG. 9(a) uses all six of the tab portions 120 to support plate portions 130, and may use the folded central portion 110 to make any necessary electrical connections.

Figure 10A:
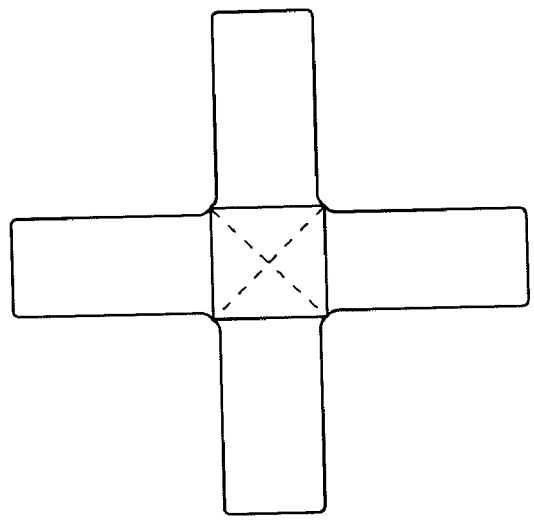
FIGS. 10(a)–(c) are top plan views of current collectors for electrode assemblies according to embodiments of the present invention.
Figure 10B:
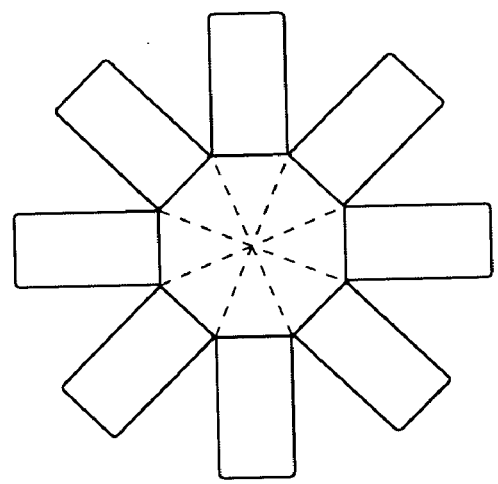
Figure 10C:
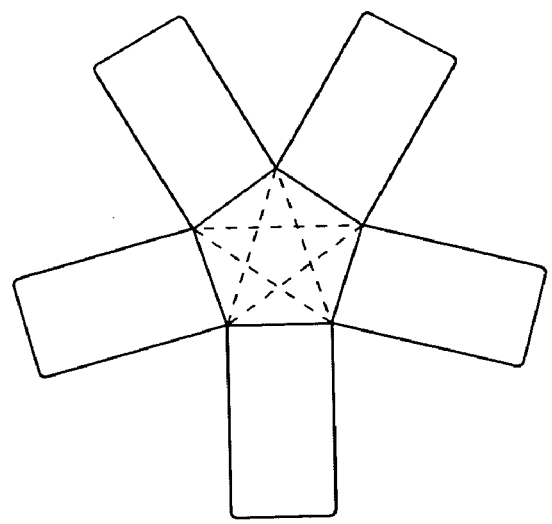

As would be appreciated by a person having ordinary skill in the art, the number of plate portions 130 supported by the current collector 100 can be adjusted by varying the number of sides of the central portion 110, and hence, the number of tab portions 120 that can support the plate portions 130. In several possible embodiments, the central portion 110 may comprise a regular polygonal shape wherein all sides of the central portion 110 are of equal length and all internal angles are equal. See FIGS. 10(a)–(c) for examples of other shapes suitable for supporting various numbers of cathode and/or anode plates. As would be appreciated by a person having ordinary skill in the art, the invention is not limited to current collectors having symmetrical or regular polygonal shapes and includes current collectors with central portions which are irregularly shaped, as well as those that do not have tab portions evenly spaced radially about the central portion.

Figure 11:
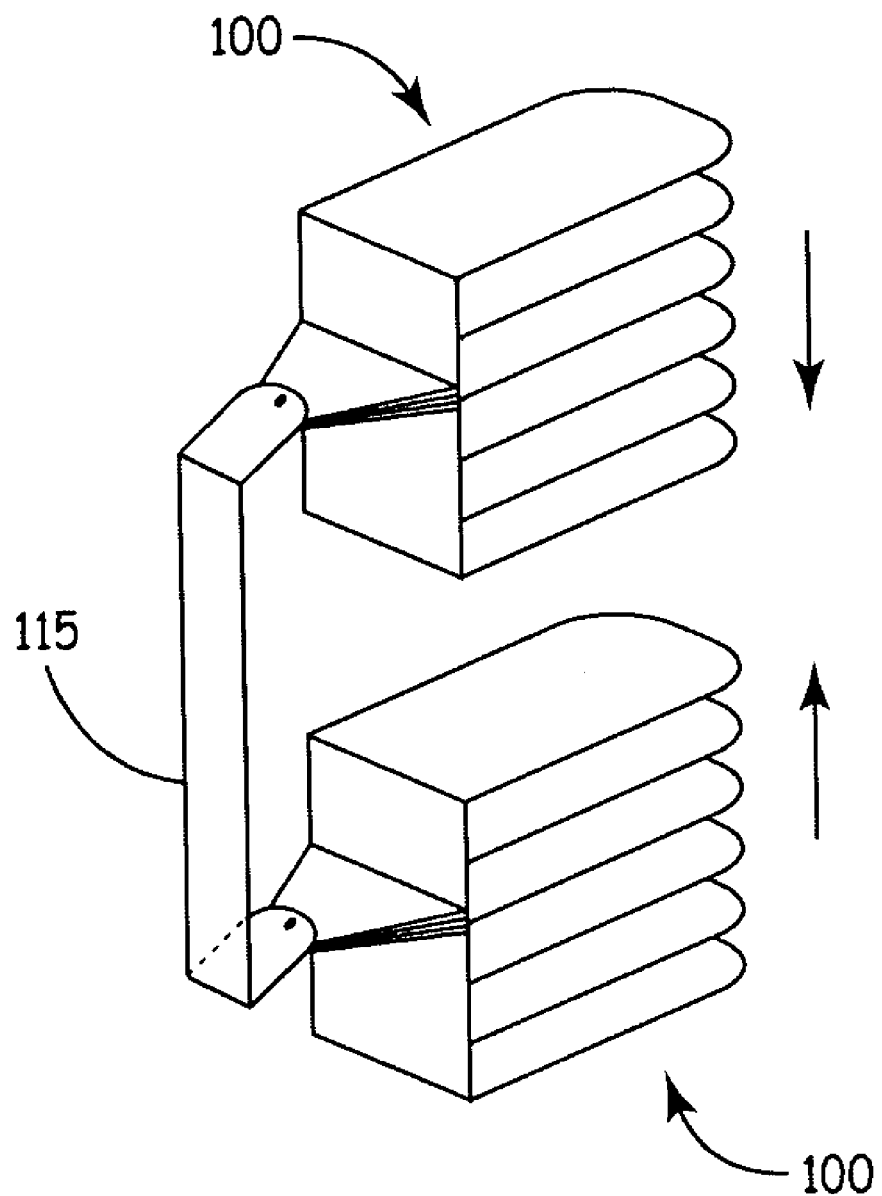
FIG. 11 is a perspective view of an electrode assembly according to an embodiment of the present invention.

In one embodiment of the invention, the number of plate portions 130 in an electrode assembly may be adjusted by using more than one current collector 100 and electrically connecting the current collectors, for example by welding a connector 115 between the folded central portions 110, as shown in FIG. 11.

As would also be appreciated by a person having ordinary skill in the art, the folded plate design described above may also be employed in the construction of analogous structures, such as the anode and cathode plates of a flat electrolytic capacitor (FEC), for example.

Figure 12:
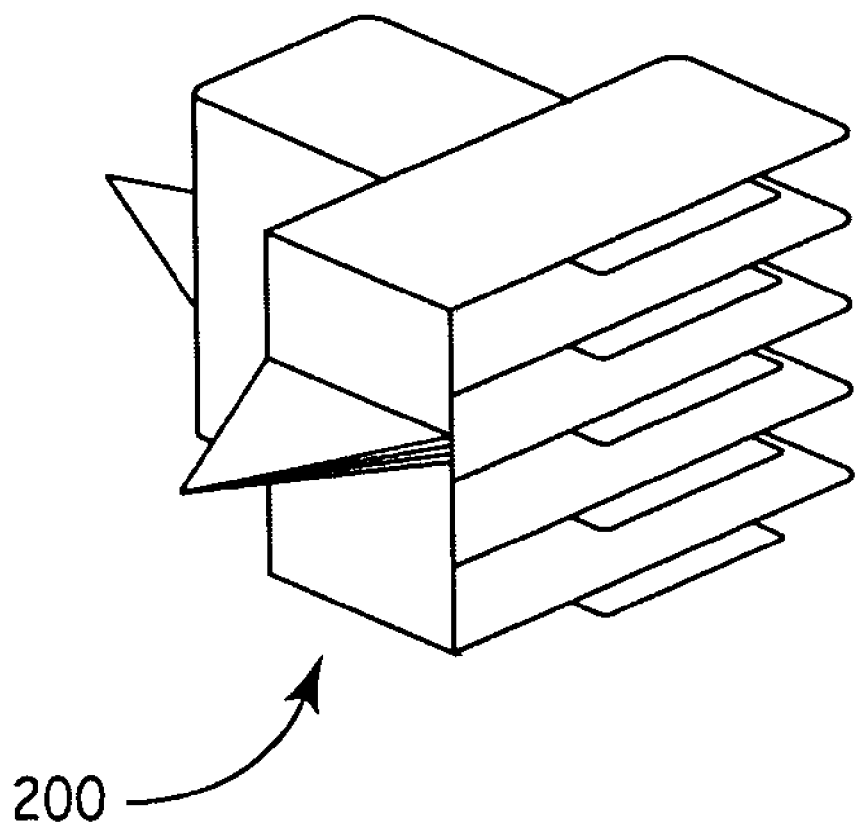
FIG. 12 is a perspective view of an electrode assembly according to an embodiment of the present invention.

The current collector 100 embodiment discussed above may apply to the anode 72, cathode 76, or both in the electrode assembly of an electrochemical cell. For example, FIG. 12 illustrates an electrode assembly 200 wherein the anode 72 and cathode 76 both incorporate the current collector 100 of an embodiment of the invention, and the respective current collectors 100 are oriented at an angle of approximately 90° with respect to each other. As shown, the plate portions 130 of the anode and cathode current collectors are interleaved.

Figure 13:
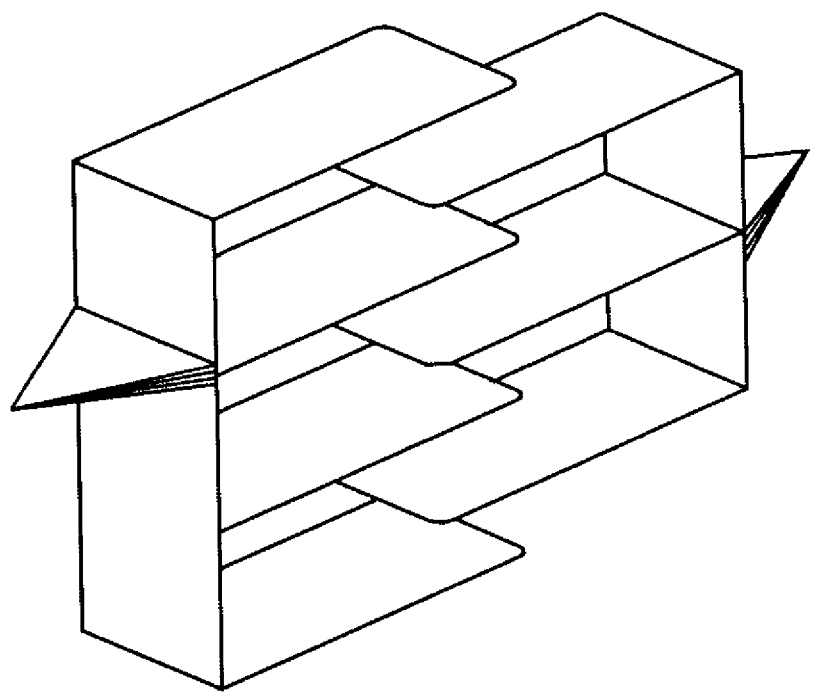
FIG. 13 is a perspective view of an electrode assembly according to an embodiment of the present invention.

FIG. 13 shows electrode assembly 200 in accordance with an alternate embodiment of the invention wherein the current collectors 100 of both the anode 72 and cathode 76 are interleaved at approximately a 180° angle. As would be appreciated by one of ordinary skill in the art, the angles at which the anode and cathode current collectors are interleaved may be varied to provide the optimum utilization of available space within the housing 50 of electrochemical cell 54.

Figure 14:
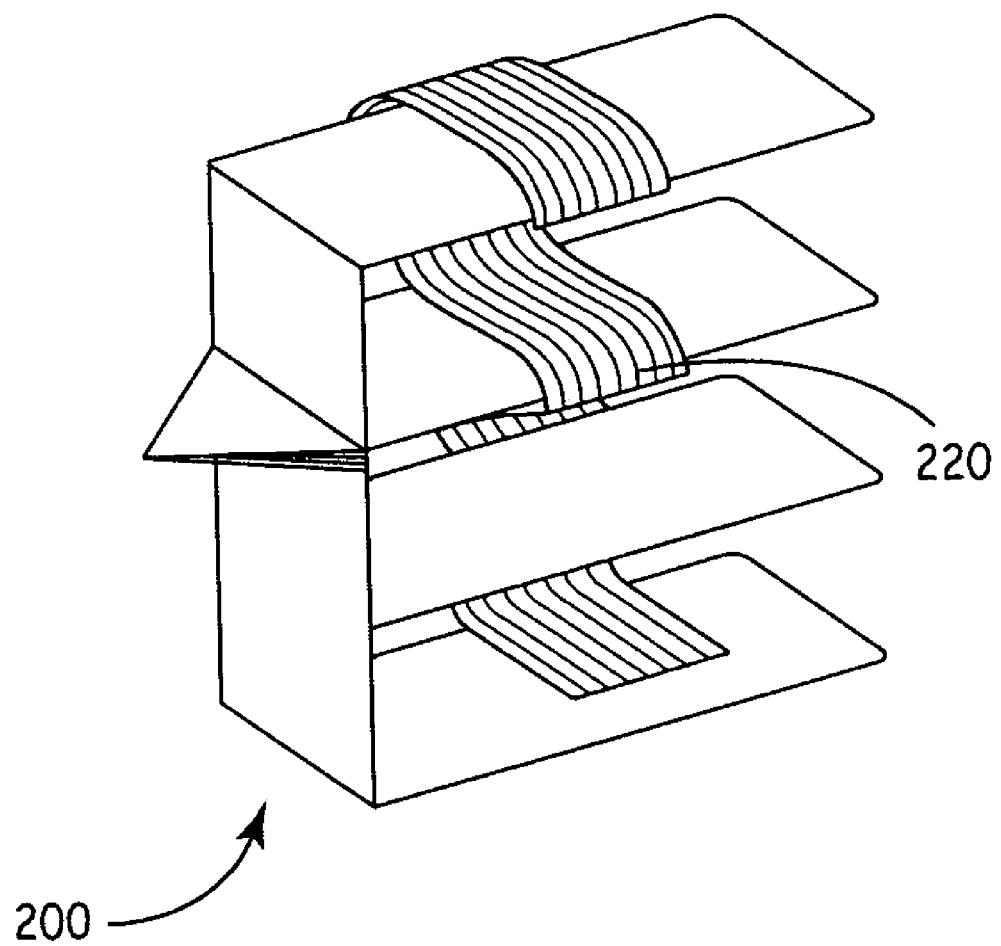
FIG. 14 is a perspective view of an electrode assembly according to an embodiment of the present invention.

FIG. 14 shows electrode assembly 200 in accordance with an embodiment of the invention wherein only one of either the cathode 76 or anode 72 utilizes the current collector 100 disclosed herein. As shown in FIG. 14, the cathode portion 76 of the electrode assembly 200 uses the folded current collector 100 of an embodiment of the invention, while the anode portion 72 is interleaved between the plates of the cathode 76 using a serpentine pattern 220. In one embodiment, a long continuous anode material surrounded by a separator material weaves continuously between the plates of the cathode 76. In an alternate embodiment of the invention, discrete anode plates are placed within a long continuous separator pouch that is interleaved between the plates of the cathode 76 in a similar manner. As would be appreciated by one of ordinary skill in the art, the anode 72 and cathode 76 portions in FIG. 14 could be reversed without departing from the scope of the invention.

Figure 15:
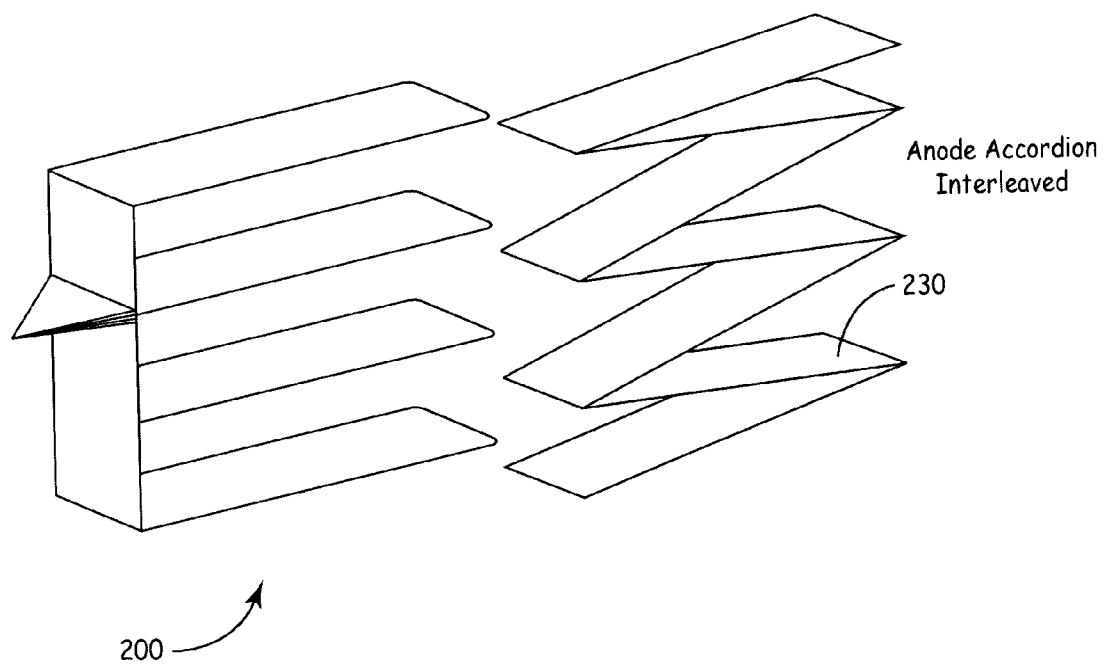
FIG. 15 is a perspective view of an electrode assembly according to an embodiment of the present invention.

FIG. 15 shows electrode assembly 200 in accordance with an embodiment of the invention wherein the cathode portion 76 includes the folded current collector 100, while the anode portion 72 is folded in an accordion fashion 230 and inserted between the stacked plate portions of the cathode 76 such that alternating folds in the anode portion 72 interleave between the plates of the cathode portion 76. In one embodiment, a long continuous anode material surrounded by separator material forms the folded accordion pattern 230 that is interleaved between the stacked plates of the cathode 76. In an alternate embodiment of the invention, discrete anode plates are placed within a long continuous separator pouch that is interleaved between the plates of the cathode 76 in a similar manner. As would be appreciated by one of ordinary skill in the art, the anode 72 and cathode 76 portions in FIG. 15 could be reversed without departing from the scope of the invention.

Figure 16:
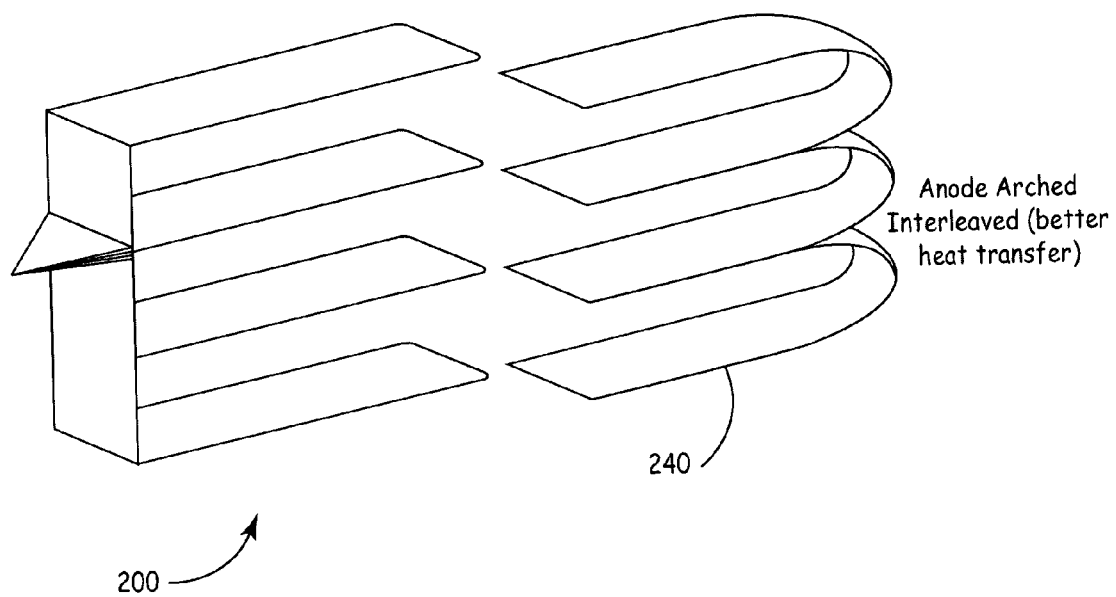
FIG. 16 is a perspective view of an electrode assembly according to an embodiment of the present invention.

FIG. 16 illustrates electrode assembly 200 in accordance with an embodiment of the invention wherein the cathode portion 76 includes the folded current collector 100, while the anode portion 72 utilizes an arched, interleaved pattern 240. This design offers potential advantages in terms of heat transfer characteristics, as well as structural integrity due to having fewer sharp folds. In one embodiment, a long continuous anode material surrounded by separator material forms the arched pattern 240 that is interleaved between the plates of the cathode 76. In an alternate embodiment of the invention, discrete anode plates are placed within a long continuous separator pouch which is interleaved between the plates of the cathode 76 in a similar manner. As would be appreciated by one of ordinary skill in the art, the anode 72 and cathode 76 portions in FIG. 16 could be reversed without departing from the scope of the invention.

Figure 17:
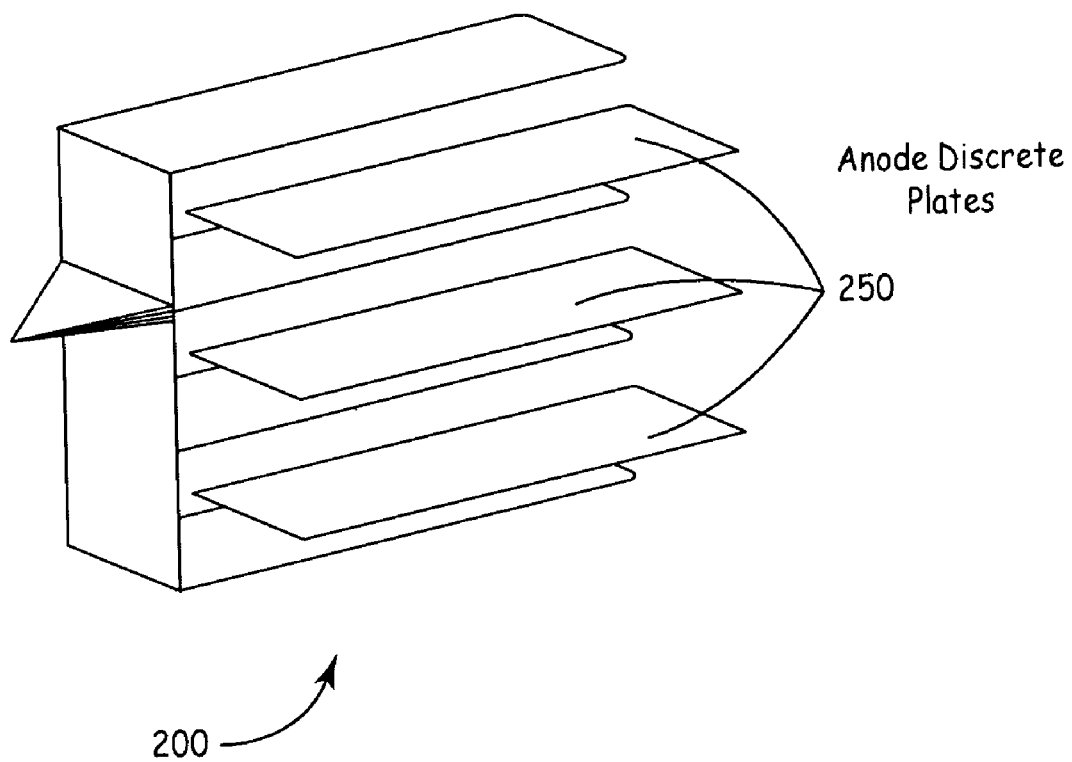
FIG. 17 is a perspective view of an electrode assembly according to an embodiment of the present invention.

FIG. 17 shows electrode assembly 200 in accordance with an embodiment of the invention wherein the cathode portion 76 includes the folded current collector 100, while the anode portion 72 is comprised of discrete plates 250 interleaved between the plates of the cathode portion 76. Discrete plates 250 may have tabs joined welded together to electrically connect the plates together. As would be appreciated by one of ordinary skill in the art, the anode 72 and cathode 76 portions in FIG. 17 could be reversed without departing from the scope of the invention.

Embodiments of the invention allow flexibility in the shape and size of the individual plates within the electrode assembly 200. This flexibility allows for the design of electrochemical cells having three-dimensional or "contoured" shapes. FIGS. 18 and 19 illustrate electrode assemblies 200 with anode and cathode plates having generally "D"-shaped configurations, with the size of adjacent plates being slightly smaller or larger, or with the positions slightly offset to produce a three-dimensional contoured surface configuration. FIGS. 18 and 19 illustrate contoured shapes that may, for example, produce an overall design that is comfortable to a patient.

Figure 18C:
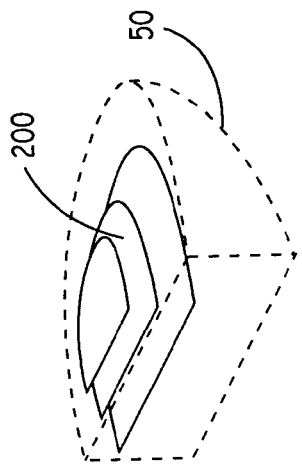
FIG. 18(c) is a perspective view of an electrode assembly according to an embodiment of the invention.
Figure 19C:
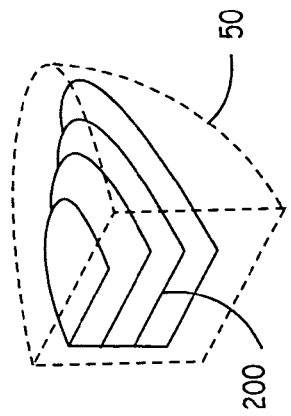
FIG. 19(c) is a perspective view of an electrode assembly according to an embodiment of the invention.
Figure 18B:
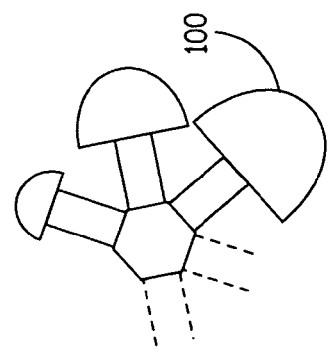
FIG. 18(b) is a top plan view of a current collector prior to folding for use in an electrode assembly according to an embodiment of the invention.
Figure 19B:
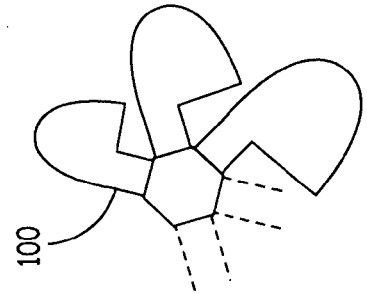
FIG. 19(b) is a top plan view of a current collector prior to folding for use in an electrode assembly according to an embodiment of the invention.
Figure 18A:
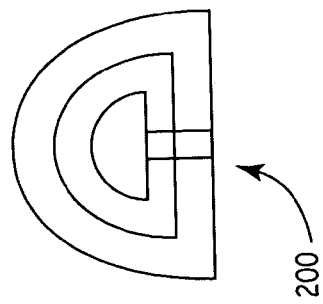
FIG. 18(a) is a top view of a current collector folded for use in an electrode assembly according to an embodiment of the invention.
Figure 19A:
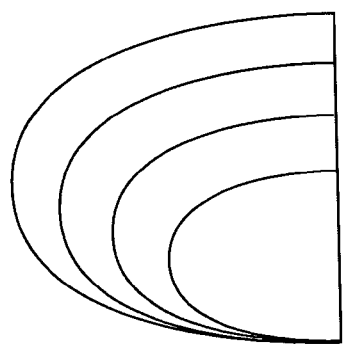
FIG. 19(a) is a top view of a current collector folded for use in an electrode assembly according to an embodiment of the invention.

FIGS. 18(a) and 19(a), for example, are top plan views of electrode assemblies 200 employing varying size and placement of the anode 72 and cathode 76 plates to produce a desired three-dimensional shape.

FIGS. 18(b) and 19(b) illustrate current collector 100 configurations that may be able to produce the overall desired shape utilizing a single piece of material to form current collector 100.

FIGS. 18(c) and 19(c) are perspective views that illustrate how the electrode assemblies 200 may fit within a shaped case 50.

Figure 20B:
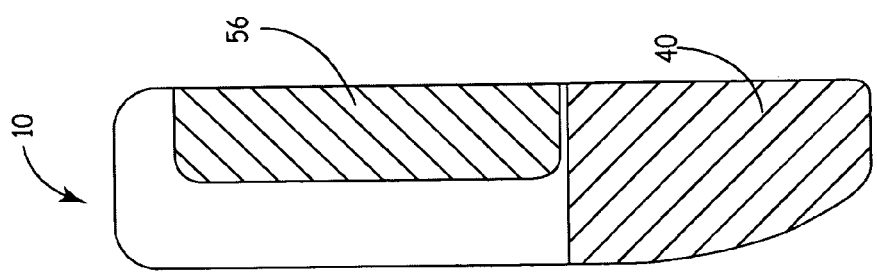
FIGS. 20(a) and (b) are front and side views, respectively, of an IMD according to an embodiment of the invention.
Figure 20A:
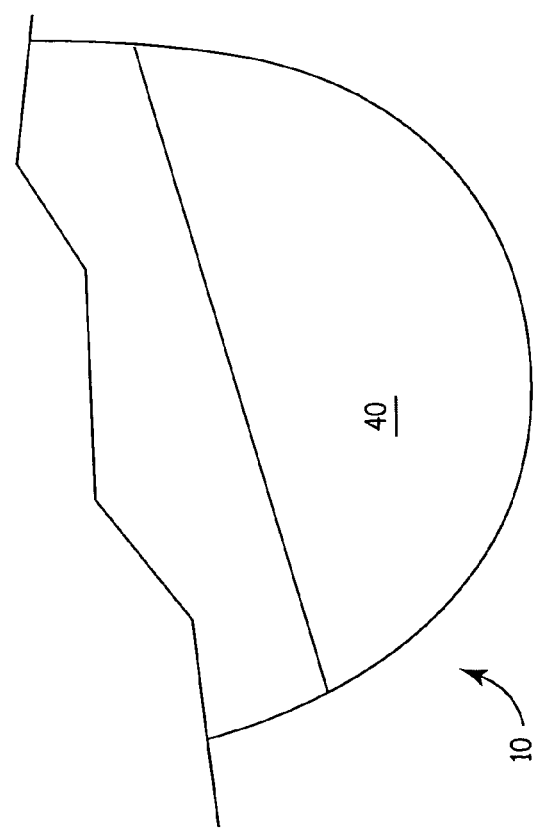

FIGS. 20(a) and (b) show a front and side view, respectively, of an IMD 10 according to one possible embodiment of the invention. IMD 10 includes battery 40 generally having a "D"-shaped profile as seen in the front view (FIG. 20(a)), and also having a contoured shape with a rounded tapered lower front portion, as seen in the side view (FIG. 20(b)). Battery 40 may achieve this shape using the folded electrode assembly 44 in accordance with an embodiment of the invention.

Figure 21B:
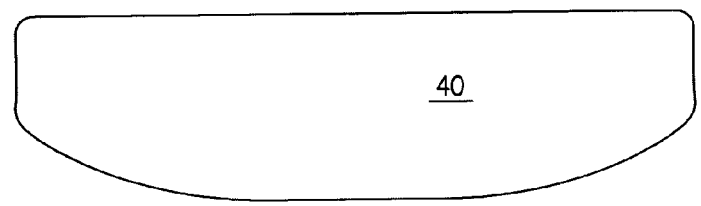
FIGS. 21(a)–(c) are side, top and front views, respectively, of an electrochemical cell according to an embodiment of the invention.
Figure 21A:
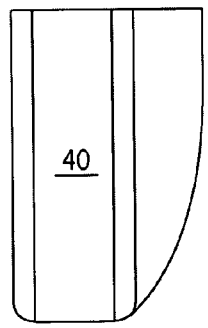
Figure 21C:
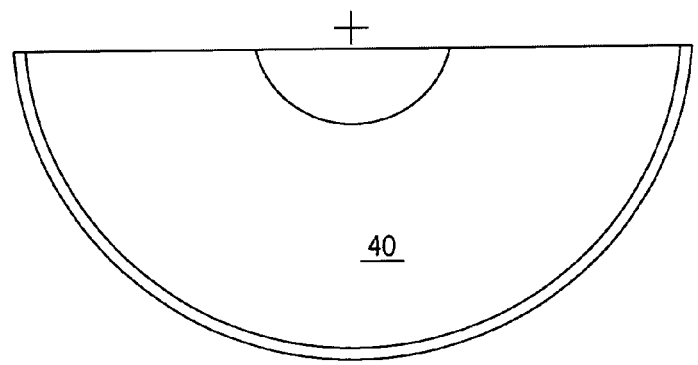

FIGS. 21(a)–(c) provide additional detail regarding the shape of battery 40 shown in FIGS. 20(a) and (b). Again, this overall shape may be achieved employing the folded electrode assembly 44 as disclosed above in accordance with embodiments of the present invention. However, the particular shapes and contours depicted in FIGS. 20 and 21 are provided for the purpose of illustration, not limitation, as many other shapes and contours may be achieved using embodiments of the invention.

Those skilled in the art will appreciate that while the invention has been described above in connection with particular embodiments and examples, the invention is not necessarily so limited and that numerous other embodiments, examples, uses, modifications and departures from the embodiments, examples and uses may be made without departing from the inventive concepts. For example, the invention should not be construed as limited to primary batteries; in fact, the present invention find application in primary and secondary batteries as well as capacitors. The actual metes and bounds of the invention are set forth in the appended claims which literally define the invention and set forth a basis for equivalents thereof.

What is claimed is:

1. An electrode assembly comprising:
a first electrode;
a second electrode;
a separator located between the first and second electrodes to prevent contact therebetween; and
at least one of the first and second electrodes being formed of an electrically conductive material folded into a compact configuration, the electrically conductive material having a central portion and a plurality of generally planar tab portions extending outwardly from the central portion when the electrically conductive material is unfolded, and
the central portion being folded in the compact configuration such that the tab portions generally overlap in a stacked arrangement, and the tab portions being folded in the compact configuration such that the stacked tab portions are spaced apart from each other.

2. An electrode assembly according to claim 1, wherein the central portion and tab portions are formed as a unitary piece.

3. An electrode assembly according to claim 2, wherein the central portion comprises at least one of: a regular polygon, an irregular polygon, an elliptical shape, a substantially circular shape, an ovoid shape.

4. An electrode assembly according to claim 2, wherein the central portion comprises a regular polygon and the number of tab portions equals the number of sides of the central portion.

5. An electrode assembly according to claim 1, wherein the tab portions are generally rectangular.

6. An electrode assembly according to claim 1, wherein the stacked tab portions extend generally parallel to each other.

7. An electrode assembly according to claim 1, wherein the tab portions extend generally radially outwardly from the center portion when the electrically conductive material is unfolded.

8. An electrode assembly according to claim 1, wherein the central portion and tab portions are etched at respective fold locations to facilitate folding.

9. An electrode assembly according to claim 1, wherein the electrically conductive material comprises a current collector.

10. An electrode assembly according to claim 1, wherein the electrodes form part of an anode assembly and a cathode assembly.

11. An electrode assembly according to claim 1, further including one or more plate portions extending from respective one or more of the tab portions.

12. An electrode assembly according to claim 11, wherein the central portion, tab portions, and plate portions are formed from a unitary piece of electrically conductive material.

13. An electrode assembly according to claim 11, wherein the plate portions comprise an electrically conductive material, and the plate portions being operatively connected to one or more of the tab portions.

14. An electrode assembly according to claim 11, wherein the central portion is folded in the compact configuration such that the plate portions are positioned to generally overlap in a stacked arrangement.

15. An electrode assembly according to claim 14, wherein at least one of the first and second electrodes is interleaved between the stacked plate portions.

16. An electrode assembly according to claim 11, wherein the plate portions are adapted to support a layer of reactive material thereon.

17. An electrode assembly comprising:
a first electrode;
a second electrode;
a separator located between the first and second electrodes to prevent contact therebetween;
at least one of the first and second electrodes including an electrically conductive material folded into a compact configuration, the electrically conductive material having a central portion and a plurality of tab portions extending outwardly from the central portion when the electrically conductive material is unfolded, the tab portions each extending into generally planar plate portions; and
the central portion being folded in the compact configuration such that the plate portions are positioned to generally overlap each other in a stacked arrangement, and the tab portions being folded in the compact configuration such that the stacked plate portions are spaced apart from each other.

18. An electrode assembly according to claim 17, wherein the central portion, tab portions, and plate portions are formed from a unitary piece of electrically conductive material.

19. An electrode assembly according to claim 17, wherein the plate portions are of generally the same size and shape.

20. An electrode assembly according to claim 17, wherein the plate portions are of varying size and shape such that the stacked plate portions form a predetermined three-dimensional shape.

21. An electrode assembly according to claim 17, wherein both the first and second electrodes are formed of the electrically conductive material and folded into the compact configuration.

22. An electrode assembly according to claim 17, wherein the other of the at least one of the first and second electrodes is interleaved between the stacked plate portions.

23. An electrode assembly according to claim 17, wherein the other of the at least one of the first and second electrodes extends between plate portions of the stacked plate portions.

24. An electrode assembly according to claim 17, wherein the plate portions are adapted to support a layer of reactive material thereon.

25. An electrode assembly according to claim 24, wherein the layer of reactive material is selected from among a list of silver vanadium oxide, lithium, an alkali, an alkaline earth metal, aluminum, tantalum, manganese dioxide.

26. An electrode assembly according to claim 17, wherein the electrically conductive material is a current collector.

27. An electrode assembly according to claim 17, wherein the electrodes form part of an anode assembly and a cathode assembly.

28. An electrode assembly according to claim 17, wherein the electrode assembly forms a portion of an electrochemical cell.

29. An electrode assembly according to claim 17, wherein the electrode assembly forms a portion of an electrolytic capacitor.

30. An implantable medical device including a hermetically sealed housing and a battery disposed within the housing for powering the implantable medical device, the battery comprising:
an anode assembly;
a cathode assembly;

a separator located between the anode and the cathode assemblies to prevent contact therebetween;

electrolyte; and a housing that holds the anode assembly, cathode assembly, separator, and electrolyte, at least one of the anode and cathode assemblies including a current collector folded into a compact configuration, the current collector having a central portion and a plurality of tab portions extending outwardly from the central portion when the current collector is unfolded, the tabs each having a generally planar plate portion, each plate portion supporting a layer of reactive materials positioned thereon, and the central portion being folded in the compact configuration such that the plate portions are positioned to generally overlap each other in a stacked arrangement, and the tab portions being folded in the compact configuration such that the stacked plate portions are spaced apart from each other.

\* \* \* \* \*